United States Patent [19]

Schalk et al.

[11] Patent Number: 4,831,551
[45] Date of Patent: May 16, 1989

[54] SPEAKER-DEPENDENT CONNECTED SPEECH WORD RECOGNIZER

[75] Inventors: Thomas B. Schalk, Dallas; George R. Doddington, Richardson, both of Tex.

[73] Assignee: Texas Instruments Incorporated, Dallas, Tex.

[21] Appl. No.: 110,062

[22] Filed: Oct. 13, 1987

Related U.S. Application Data

[63] Continuation of Ser. No. 13,154, Feb. 10, 1987, abandoned, which is a continuation of Ser. No. 461,884, Jan. 28, 1983, abandoned.

[51] Int. Cl.⁴ ............................................. G10L 5/00
[52] U.S. Cl. .................................. 364/513.5; 381/43; 381/47
[58] Field of Search ..................... 381/41–50; 364/513.5

[56] References Cited

U.S. PATENT DOCUMENTS

| | | | |
|---|---|---|---|
| 3,975,587 | 8/1976 | Dunn et al. | 381/40 |
| 4,100,370 | 7/1978 | Suzuki et al. | 381/42 |
| 4,158,750 | 6/1979 | Sakoe et al. | 381/43 |
| 4,403,114 | 9/1983 | Sakoe | 381/42 |

Primary Examiner—Emanuel S. Kemeny
Attorney, Agent, or Firm—William E. Hiller; N. Rhys Merrett; Melvin Sharp

[57] ABSTRACT

Speech recognition is improved using reference pattern templates which have an added noise signal (noise floor) to avoid LPC high-gain synthesizer instability at low signal levels. Also, input signal frames have a length one-half that of reference frames whereby dynamic time warp computation steps are cut almost in half.

4 Claims, 26 Drawing Sheets

Microfiche Appendix Included
(1 Microfiche, 63 Pages)

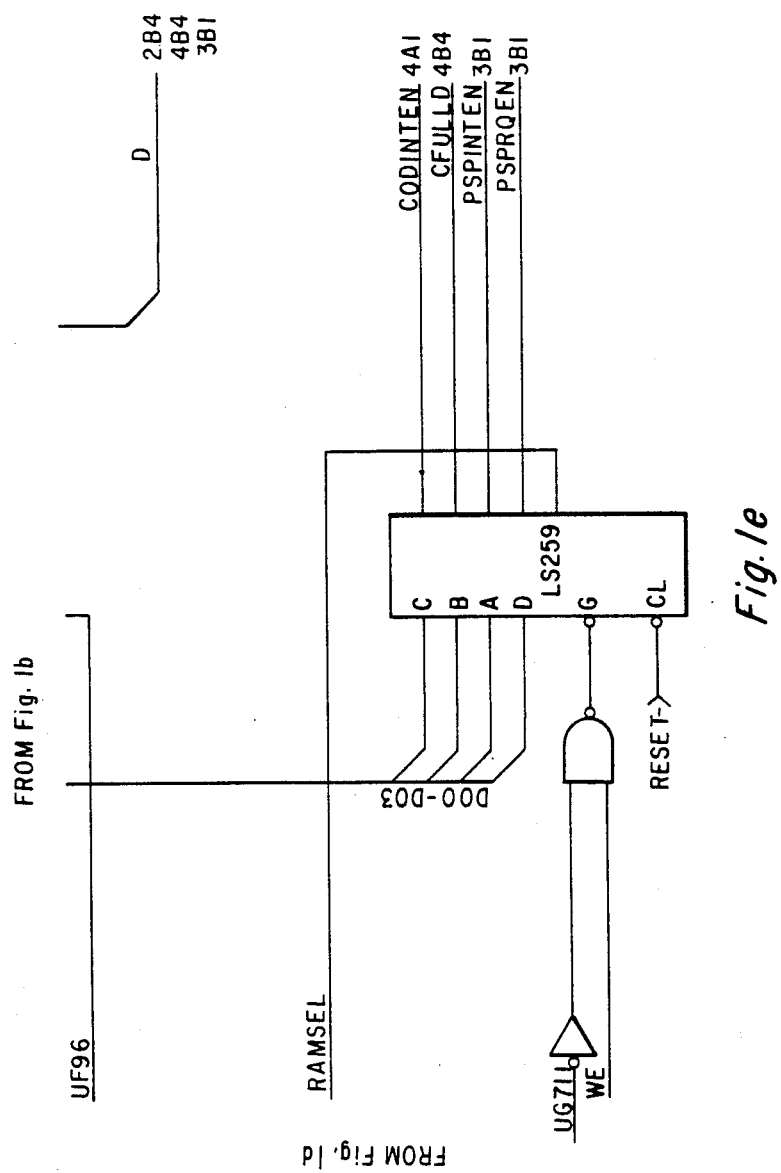

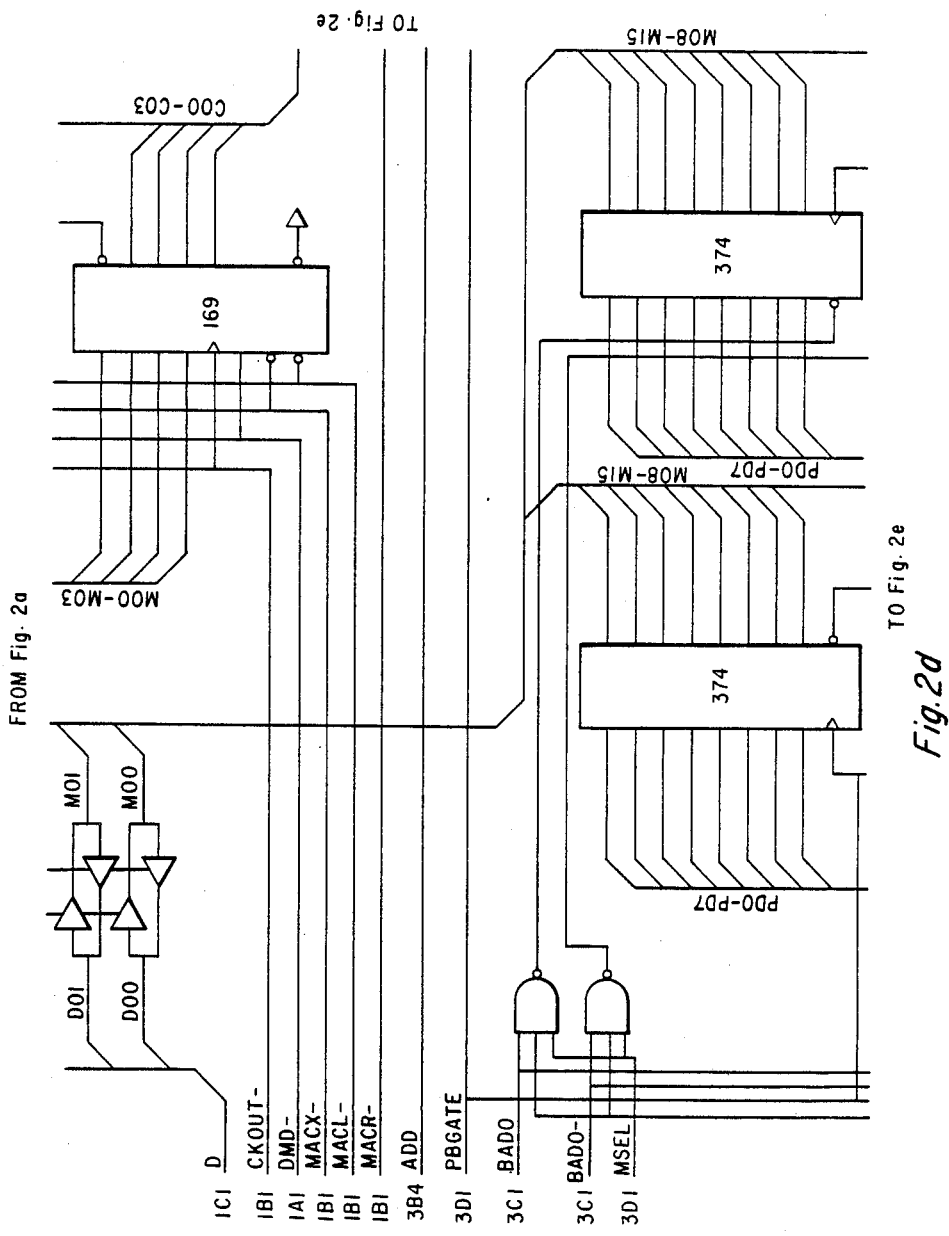

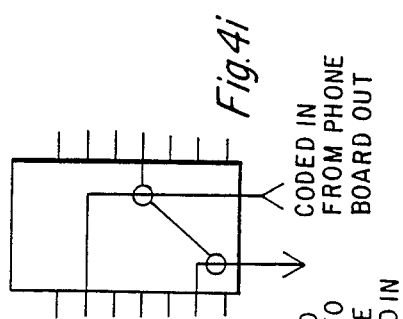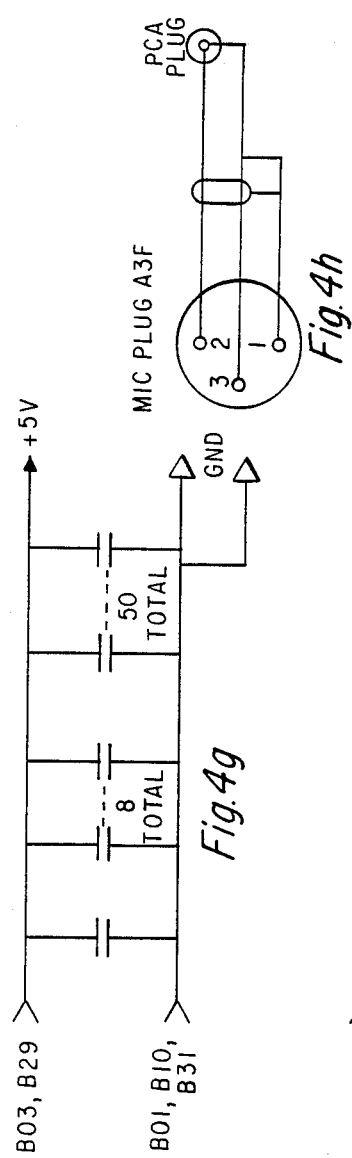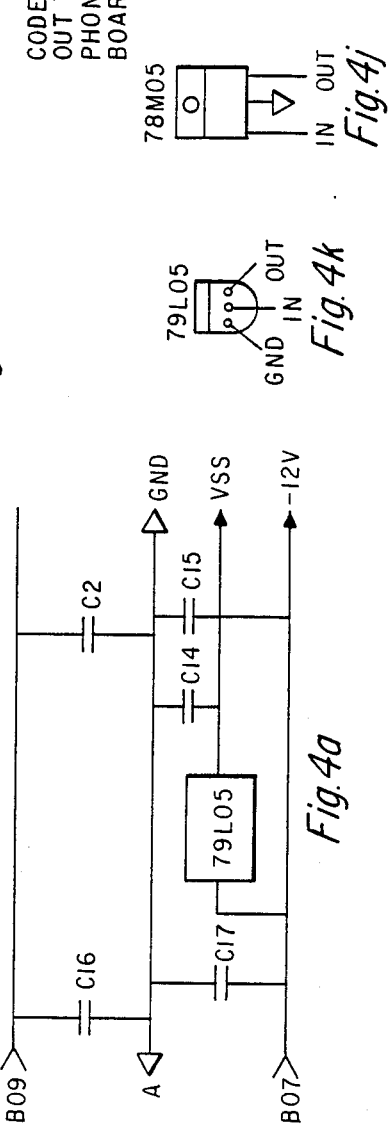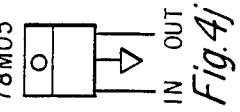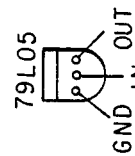

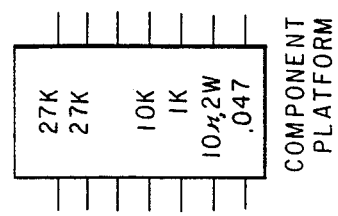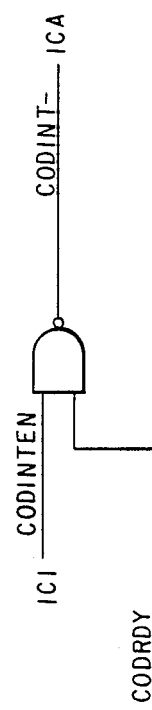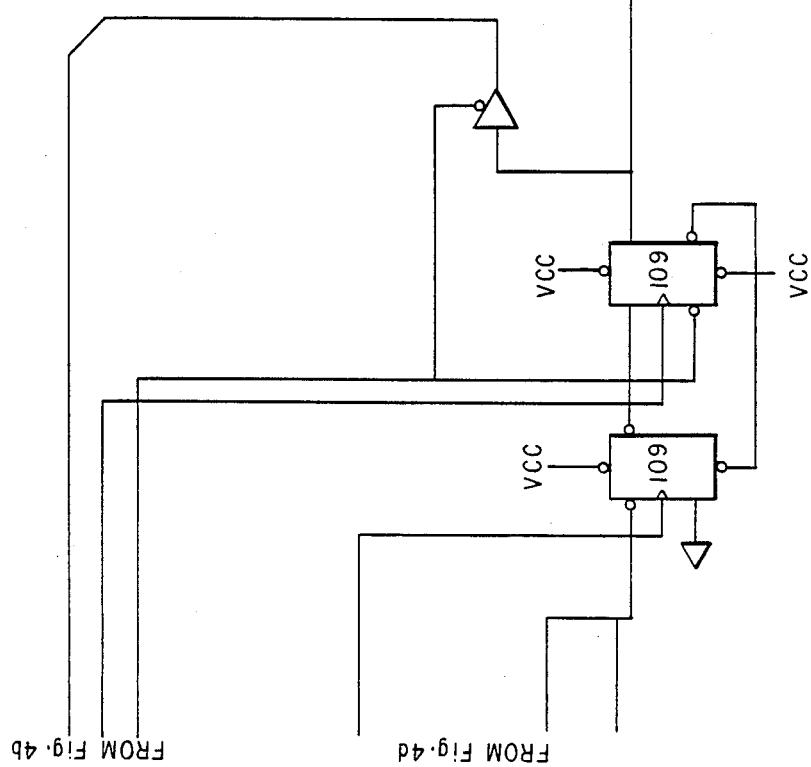

SPEAKER-DEPENDENT CONNECTED SPEECH WORD RECOGNIZER

This application is a continuation of application Ser. No. 013,154, filed 2/10/87, now abandoned, which is a continuation of application Ser. No. 461,884, filed Jan. 28, 1983, now abandoned.

A microfiche appending is in the file, showing program listings on one sheet of sixty-three frames.

BACKGROUND AND SUMMARY OF THE INVENTION

The present invention relates to an automatic method for recognizing words embedded in connected speech.

From the beginning of the development of machine speech recognition, algorithms for performing speech recognition have been paced by the relative ability to implement them. As digital computers began to be used for speech research, however, the possibility of nonreal-time processing allowed algorithm development to outpace the capabilities available for real-time implementation. The 1970's were characterized on the one hand by increasing algorithmic complexity and on the other by considerable effort dedicated toward implementing cost-effective algorithms. The consumers of speech recognition technology have been caught in an unsatisfactory tradeoff between high performance speech recognition and low-cost implementation resulting in word recognition systems of marginal performance, excessive cost, and hence, dubious value.

In the past, microprocessors possessing sufficient computational power to process speech signals have been of special design—"custom IC's" . Examples of such processors are the "Speak & Spell" speech synthesizer chip and the various CCD and other analog speech analyzer chips. Now, however, another threshold of competency has been reached with the advent of programmable digital signal processors that are capable of performing a variety of functions including speech synthesis, word recognition, vocoding, voice verification, and even non-speech applications such as high-speed modems. The programmability of these signal processor chips is a very significant feature which overcomes two major problems with the development of special-purpose IC's for speech processing applications. First, the development cost for a special chip typically outweigh the market potential for such a chip (the "Speak & Spell" speech synthesizer was a notable exception), and second, lack of flexibility and "extensibility" of custom chips often minimize their useful lifetimes (especially considering the large development efforts required and the rapid development of speech processing technology). Furthermore, because of their programmability, a much broader market is created for programmable digital signal processor chips. Programmability has special importance for speech processing because of the relatively primitive stage of speech recognition algorithms. As the recognition technology is improved, some of these improvements may be incorporated through programming changes, rather than through system redefinition and redevelopment of integrated circuits.

It is now reasonable to plan for high-performance speech recognition systems based around these high-speed digital signal processor chips. These chips will perform all speech processing functions, including speech analysis and feature extraction, word recognition, pitch tracking, and speech synthesis using algorithms which have been identified as providing superior performance.

Overview

The four basic steps involved in the recognition of speech are: feature extraction, time registration, pattern similarity measurement, and decision strategy. An additional task which is required prior to speaker-dependent recognition is referred to as enrollment. This is the process by which speaker-dependent reference patterns are formed to be used during the recognition process. Current speech recognition systems use a variety of techniques to perform these basic steps. Each approach has its own performance and cost mix. The system described here is unique in that it provides robust performance in a connected word environment with a low-cost implementation.

The basic speech recognition strategy is to "scan" the incoming speech data continuously, perform dynamic programming, compute a similarity measure or "distance" between the utterance spoken and the stored reference pattern, and decide if the similarity measure is sufficiently small to declare that the utterance is recognized. The major algorithm steps which are implemented are: autocorrelation, matched residual energy distance computation, dynamic programming time alignment, event detection, and high-level post-processing. Parameters which are used to measure the similarity between input utterances and stored templates are computed by the autocorrelation and residual energy algorithms. Dynamic programming time registration is used to determine the minimum distance between the word spoken and each stored reference pattern. Word recognition candidates are hypothesized by locating valley points in the minimum dynamic programming distance taken across all candidates. The recognition candidates are passed to high-level decision logic which applies a threshold comparison test and next-closest error threshold test to determine if the utterance is to be declared.

Feature Extraction

A variety of signal processing techniques exist for representing a speech signal in terms of time varying parameters which are useful for speech recognition. Examples of these signal processing transformations are the direct spectral measurement (mediated either by a bank of bandpass filters or by a discrete Fourier transform), the cepstrum, and a set of suitable parameters of a linear predictive model (LPC) (See J. D. Markel and A. H. Gray, Jr., "Linear Prediction of Speech", Springer-Verlag, New York, (1976)). Selection of the parameters depends to a considerable degree on implementation considerations. However, it is generally agreed that the linear predictive modeling techniques have performance comparable to or better than other techniques for speaker-dependent recognition tasks. Furthermore, an LPC-based recognition algorithm is attractive because of its compatibility with LPC-based speech analysis and synthesis techniques. For these reasons, and considering implementation using a digital signal processor chip, we have developed a recognition algorithm that is LPC-based.

SIMILARITY MEASURE

After feature extractions, the next basic recognition step is the computation of a similarity measure between a stored reference and the time-normalized parameters extracted from the utterance. The basic similarity measuring technique used in this system is patterned after that of F. Itakura, "Minimum Preduction Residual Principle Applied to to Speech Recognition," IEEE Trans. Acoust., Speech, Signal Processing, ASSP-23, 67–72 (1975). In the Itakura approach, recognition is achieved by performing a frame-by-frame comparison of speech data using a normalized prediction residual. The LPC prediction residual energy is measured by passing the input speech signal (for the frame in question) through an all-zero inverse filter which represents the reference data. If the reference data matches the input data then the spectral notches in the inverse filter will match the spectral peaks in the input signal and a low-energy residual output will result. This residual energy is normalized by the residual energy which results when the inverse filter is optimally matched to the input data. The resulting normalized residual error is thus stabilized to be greater than 1. It typically takes on values of less than 1.2 for a good recognition match in speaker-dependent word recognition environments.

The prediction residual is computed easily as the inner product of the autocorrelation function of the input with the autocorrelation function of the impulse response of the inverse filter. Normalization by the residual of the input signal is not so simple. In essence the autocorrelation matrix must be inverted and the traditional method of choice is Levinson's algorithm (N. Levinson, "The Wiener RMS (Root Mean Square) Error Criterion in Filter Design and Prediction", J. Math. Phys. 25, 261–278 (1947)). An intermediate computation to a magnitude which is less than 1 was demonstrated by LeRoux and Gueguen, see J. LeRoux and C. Gueguen, "A Fixed Coefficient", IEEE Trans. Acoust., Speech, Signal Processing, ASSP-25, 257–259 (1977), and it is this variation of Levinson's algorithm that has been selected for implementation.

Dynamic Programming

The measurement of similarity between the incoming speech and stored vocabulary representations requires compensation for changes in the length and timing of the input utterance. Thus, it is desirable to time warp the feature vectors obtained from the incoming data in some optimal sense prior to the comparison with stored feature vectors. The approach utilized in this system is a unique modification of the typical dynamic programming algorithm. In principle, the dynamic programming procedure is similar to that used by Itakura. Several modifications have been made to the basic Itakura approach, however. The Itakura approach assumes that the reference data is comprised of feature vector measurements obtained from frames of the speech signal which have the same length as the frames utilized during the recognition analysis procedure. The frame period of the input analysis is usually 10 to 20 msec in order to capture dynamic speech events. The basic difference between the Itakura approach and the approach used here is that reference data are represented only at every other input frame. This approach has three advantages. First, it halves the amount of reference data that must be stored. Second, it halves the number of dynamic programming computations that must be performed. Third, it simplifies the dynamic programming computation by eliminating the memory element required in the basic Itakura technique.

There are two other significant modifications to the Itakura time registration technique as implemented in this recognition system. First, and most significant, the endpoints are unconstrained. That is, there is no requirement that the dynamic optimization routine be constrained to start and end on specific input speech frames. This is a very significant simplification because it separates the high level word finding logic from the dynamic programming/recognition processing. Second, penalty errors are added, according to a nonlinear scale, when local warping occurs. Although a time warping factor of two may still be achieved, the algorithm prefers utterances with durations equal to the template duration.

Although processing time is substantially increased by not specifying the starting and ending input speech frames, there are two further reasons for having unconstrained endpoints. First, the system reliability is substantially improved by eliminating the requirement for endpoint determination. Accuracy requirements of 98% recognition or better would require the reliability of endpoint determination to be at least 98%. This is unrealistic, assuming that endpoint determination is based upon information that is not word specific. Second, the system is able to perform recognition of vocabulary words embedded in connected speech. By using the unconstrained endpoint dynamic programming algorithm, this system is able to perform recognition of vocabulary words which are not separated discretely in time. This is a distinct advantage over most other word recognition systems.

Decision Strategy

For each frame of input data, a sequence of scanning errors (similarity measures) are computed assuming that the current input frame corresponds to the last reference frame of each reference pattern. The best and next-best errors are stored along with the corresponding word indices. Before a word in the vocabulary can be hypothesized, a valley point in the scanning error minimum must be declared. The valley finding process is a key element in simplifying the decision strategy. A valley finding capability specially designed to satisfy word recognition applications is used. A local valley is defined as the minimum value in a subsequence of errors which begins and ends with values greater than or equal to this valley multiplied by a minimum peak-to-valley ratio. A word is recognized when five conditions are met:

1. A valley has been declared;
2. The dynamic programming scanning error (EVAL) is less than EMIN;
3. The next-best error is greater than EVAL+EDELT;
4. The prior hypothesis occurred at least TDELT time units ago where this time is related to the number of reference frames in the templates under consideration; an
5. The maximum energy during the utterance has exceeded EMAX;

where EMIN, EDELT, TDELT, and EMAX are specified constants. All accumulated hypotheses are output when "silence" has occurred for a specified amount of time (typically 300 msecs). A frame is considered silent when the frame energy is less than a specified fraction (typically 0.1) of the maximum energy in the utterance.

Enrollment

The purpose of enrollment is to create a set of feature vectors for each vocabulary word which are utilized in the similarity measurement process during recognition.

The enrollment strategy is to provide energy-based definition of start/stop time for an initial reference pattern for each vocabulary word, and then to update these reference patterns through a predetermined set of word sequences that admits connected multiple word utterances.

In the initial enrollment mode, one pass is made through the vocabulary and initial reference patterns are formed based upon energy endpoints of each utterance. The actual start and stop times include some padding (typically one frame) to allow conservative, and therefore more reliable, energy endpoint detections. For every reference frame, the speech autocorrelation coefficients are stored. These sets of coefficients determine the inverse filters. The reference patterns are represented in terms of the autocorrelation function of the inverse filter coefficients. Reference frames that have weak energy levels are weighted less than those with energies above a specified percentage of the maximum energy of a given reference template. This energy weighting is necessary to maintain high performance under noisy operating conditions.

After the initial templates are formed, additional passes through the vocabulary are collected from the user and are used to update the initial templates. The averaging algorithm uses the time registration information obtained from dynamic programming to determine which input coefficients are to be averaged with those stored as reference. For each prompt, the input utterance is compared with the reference data stored for that word. If the utterance is recognized (i.e. the scanning error is less than a threshold), then the template is updated by averaging the appropriate input speech autocorrelation coefficients with those stored as reference. If the utterance is not recognized (i.e. a poor match occurs), then the utterance is reprompted. The above process may be repeated as many times as is desired. More weight in the averaging process is assigned to those templates which have been updated multiple times. For example, during the Nth update the reference template is assigned a weight of $N/N+1$ while the input data is assigned a weight of $1/N+1$. This achieves equal weighting of 11 input tokens.

Experiments indicate that a significant improvement in performance is achieved by successive updating of each reference template. Substitution rate decreases substantially as the number of training tokens increases..For example, when five training tokens are used to update the initial template, the corresponding substitution error rate decreases by a factor of three over that measured with one training pass. Improved connected speech recognition performance is achieved by prompting for connected speech and updating the isolated templates as described above.

Thus, while an LPC-based system for speech recognition is preferable in many respects, prior art LPC systems have suffered from instabilities which can be caused by high-gain portions of the filter.

Thus, it is a further object of the present invention to provide a speech recognition system which is LPC-based and which is not subject to instability.

Thus, it is a further, object of the present invention to provide a speech recognition system which is LPC-based and in which the LPC inverse filter does not contain any very high gain portions.

It is a further object of the present invention to provide a system for recognizing words within connected natural speech.

It is a further object of the present invention to provide a speaker-dependent system for recognizing words within connected natural speech.

It is a further object of the present invention to provide a system which recognizes words within natural speech, at a very low rate of incorrect identification.

It is a further object of the present invention to provide a method for recognizing words within connected speech of a limited vocabulary.

BRIEF DESCRIPTION OF THE DRAWINGS

The present invention will be described with reference to the accompanying drawings, wherein:

FIGS. 1a through 1f show a portion of a schematic diagram of a speech processing plug-in card for a computer;

FIGS. 2a through 2g show a second portion of a schematic diagram of a speech processing plug-in card for a computer;

FIGS. 4a through 4k show a fourth portion of a schematic diagram of a speech processing plug-in card for a computer.

DESCRIPTION OF THE PREFERRED EMBODIMENTS

The description of the present invention breaks fairly naturally into several parts: First, the basic raw distance measure, which is used to measure the dissimilarity between a particular frame of input speech and each frame of reference data, will be described. After that, the dynamic programming method which translates this raw frame-to-frame distance measure into a measure of the dissimilarity between frame sequences will be described. Next, the logic for word identification is described. The method by which the reference data for a particular speaker are prepared will then be described.

The basic raw distance measure is generally similar to that disclosed in such prior art as Itakura, "Minimum Prediction Residual Principle Applied to Speech Recognition," IEEE Transactions in Acoustics, Speech, and Signal Processing, volume 23, page 67 (1975), which is hereby incorporated by reference. However, the present invention contains significant modifications to prior art methods, and, in particular, contains one very fundamental innovation which permits LPC inverse filter methods to be practically workable, which they have not been previously. Briefly, the instability and sensitivity normally caused by the high-gain response portions of an LPC inverse filter are easily avoided, by introducing a noisy floor into the LPC parameters corresponding to the reference frame data. This noise floor is introduced merely by multiplying the energy coefficient ($R_0$, the zero- order autocorrelation of the time series) by a small constant factor, e.g. 110%. This noise floor means that, in general, there will be no poles of the inverse filter near the unit circle, and therefore the response characteristic of the inverse filter will not contain any very high gain portions.

The dissimilarity measure itself will first be described, and then the method by which new reference data are prepared will be described.

Figure 1A:
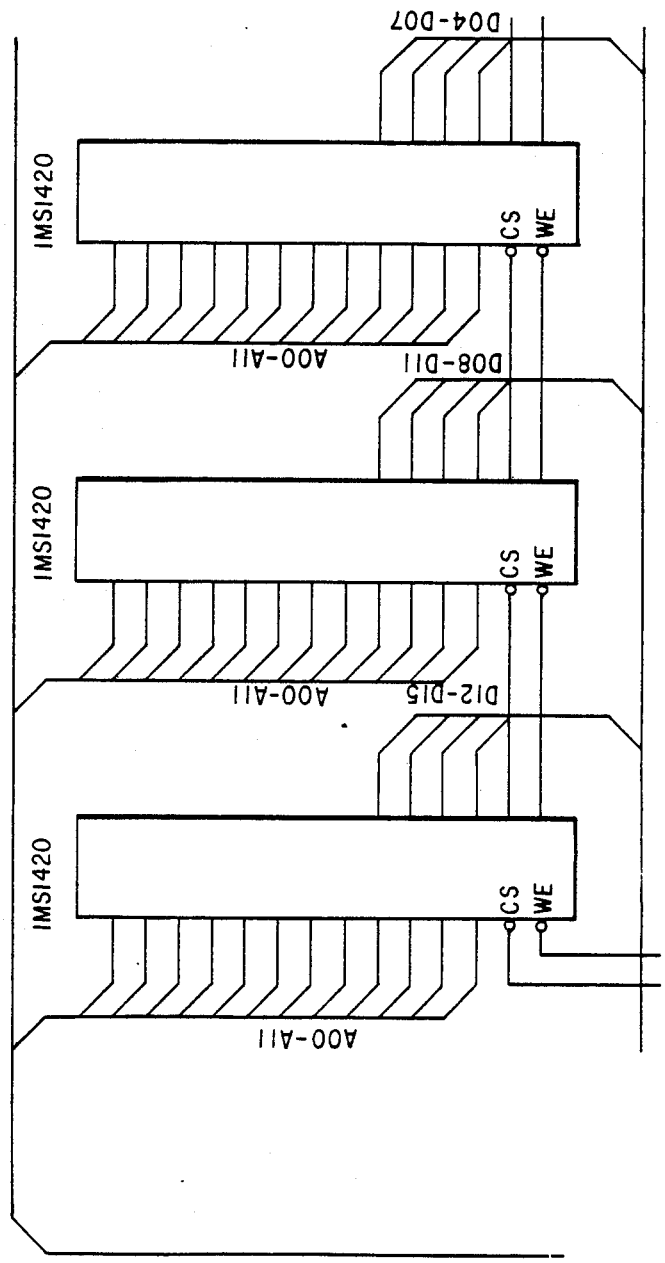
Figure 1B:
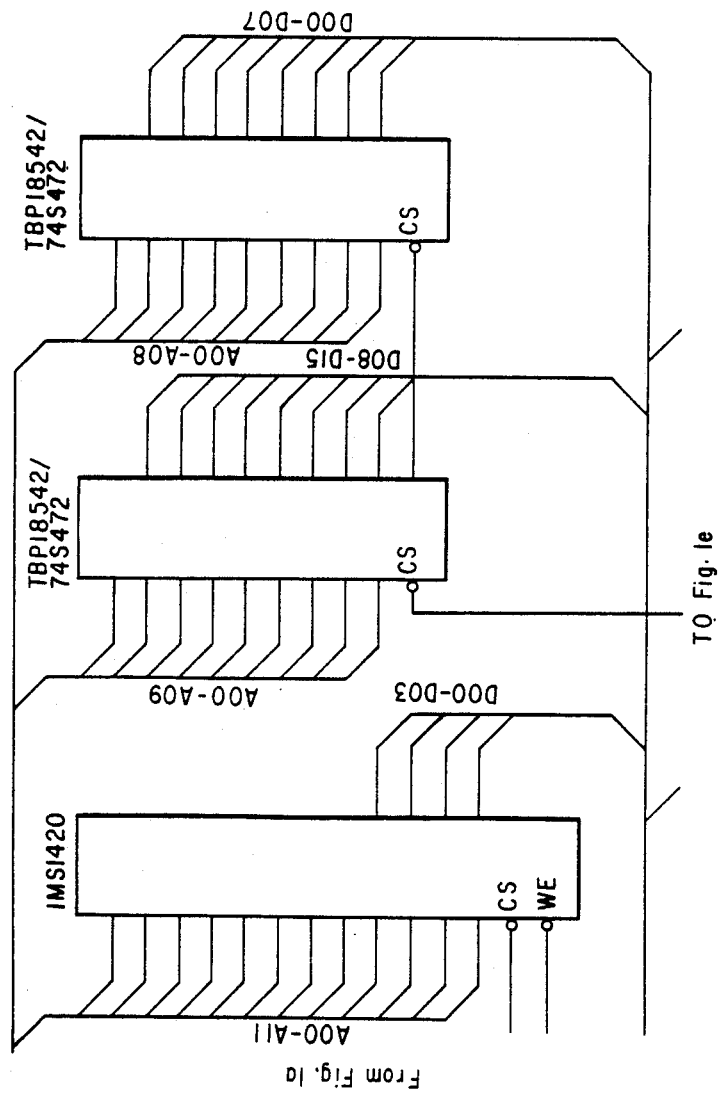
Figure 1C:
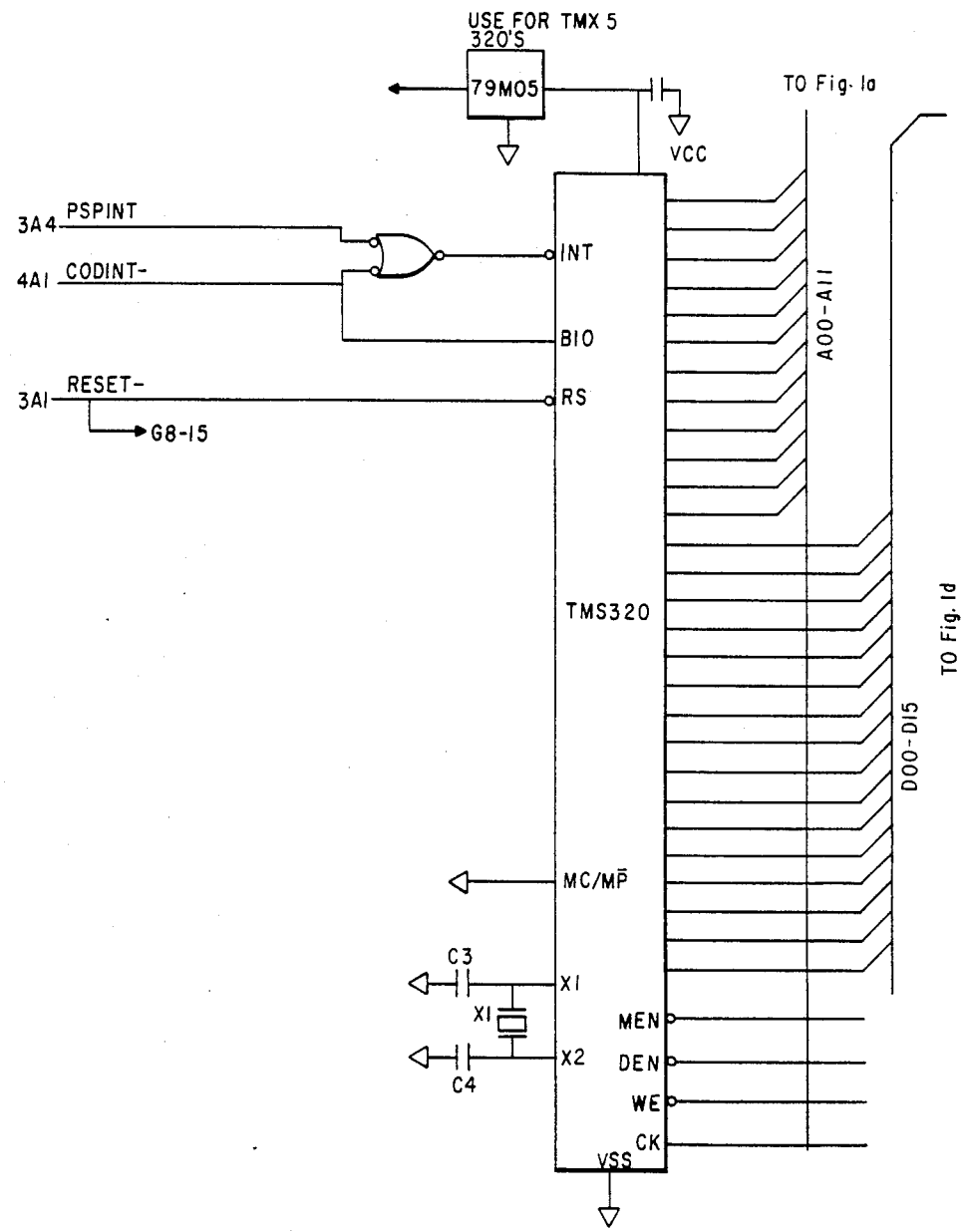
Figure 1D:
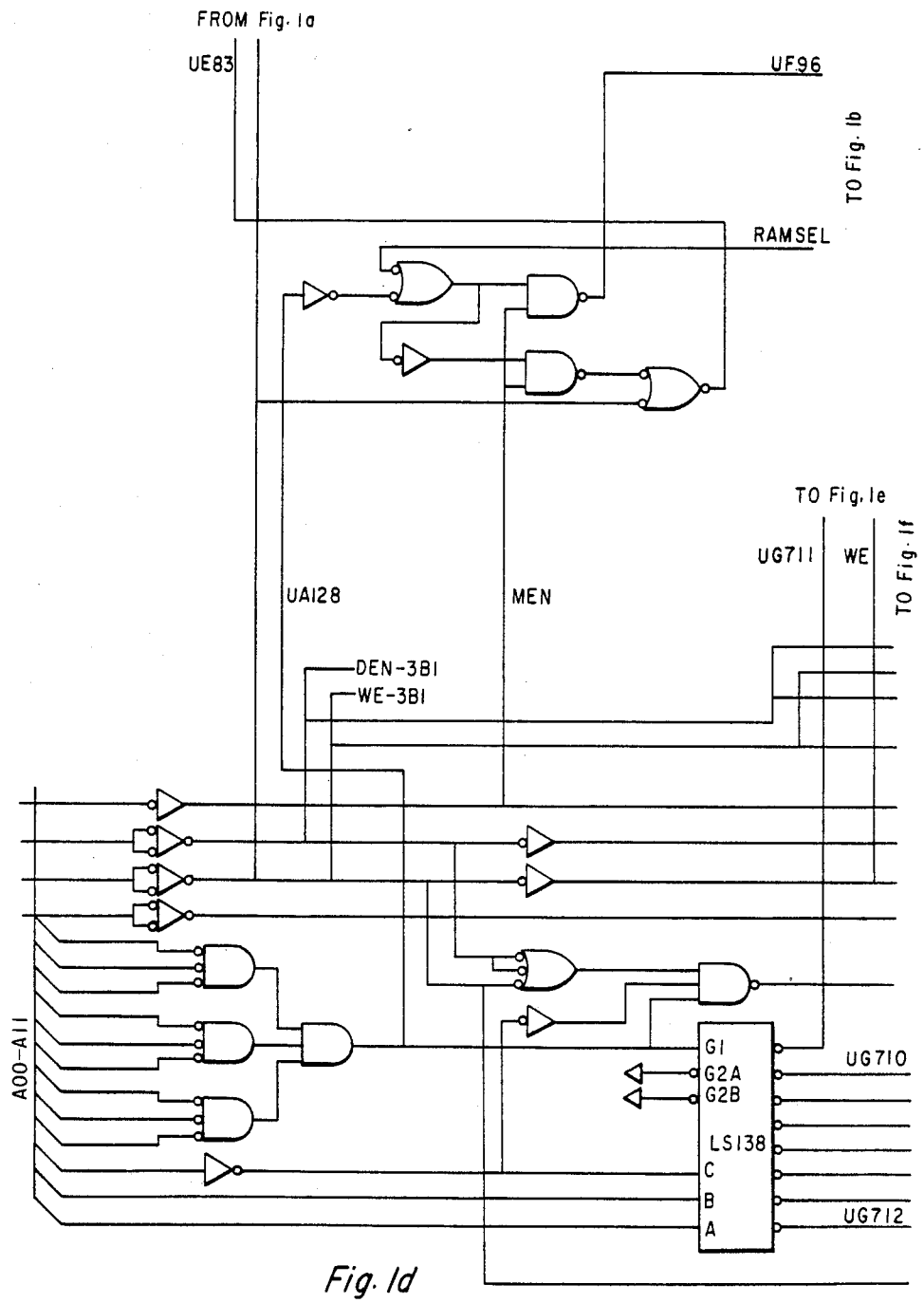
Figure 1F:
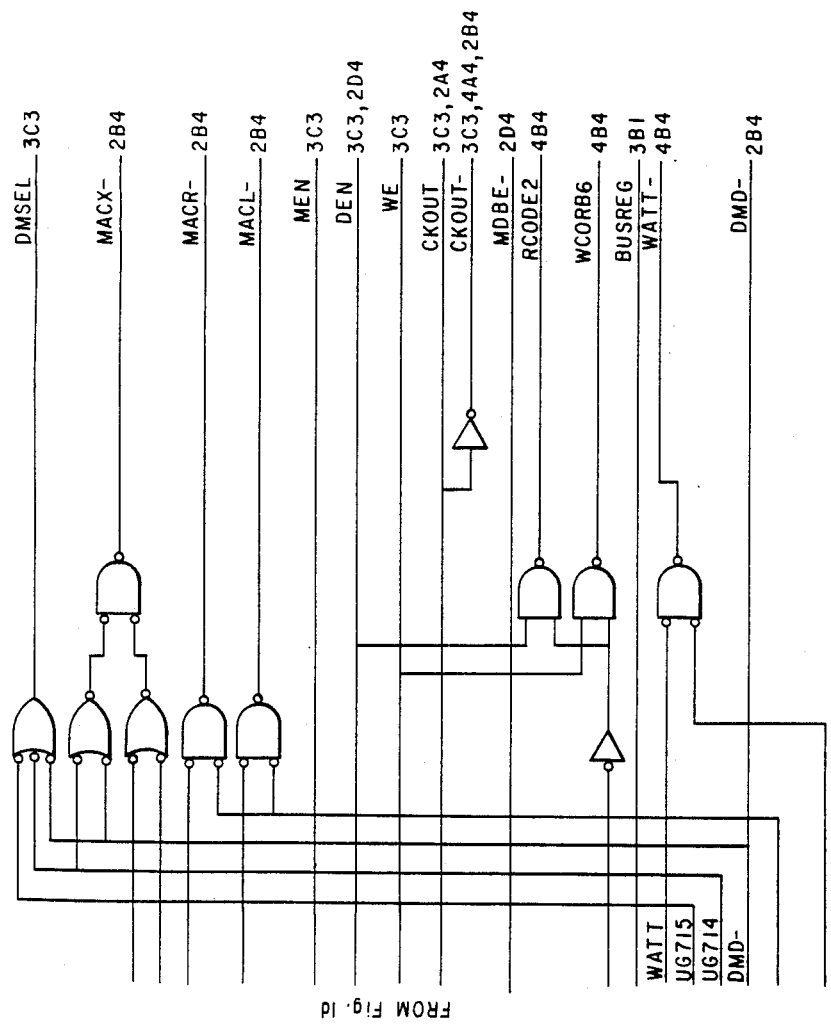
Figure 2A:
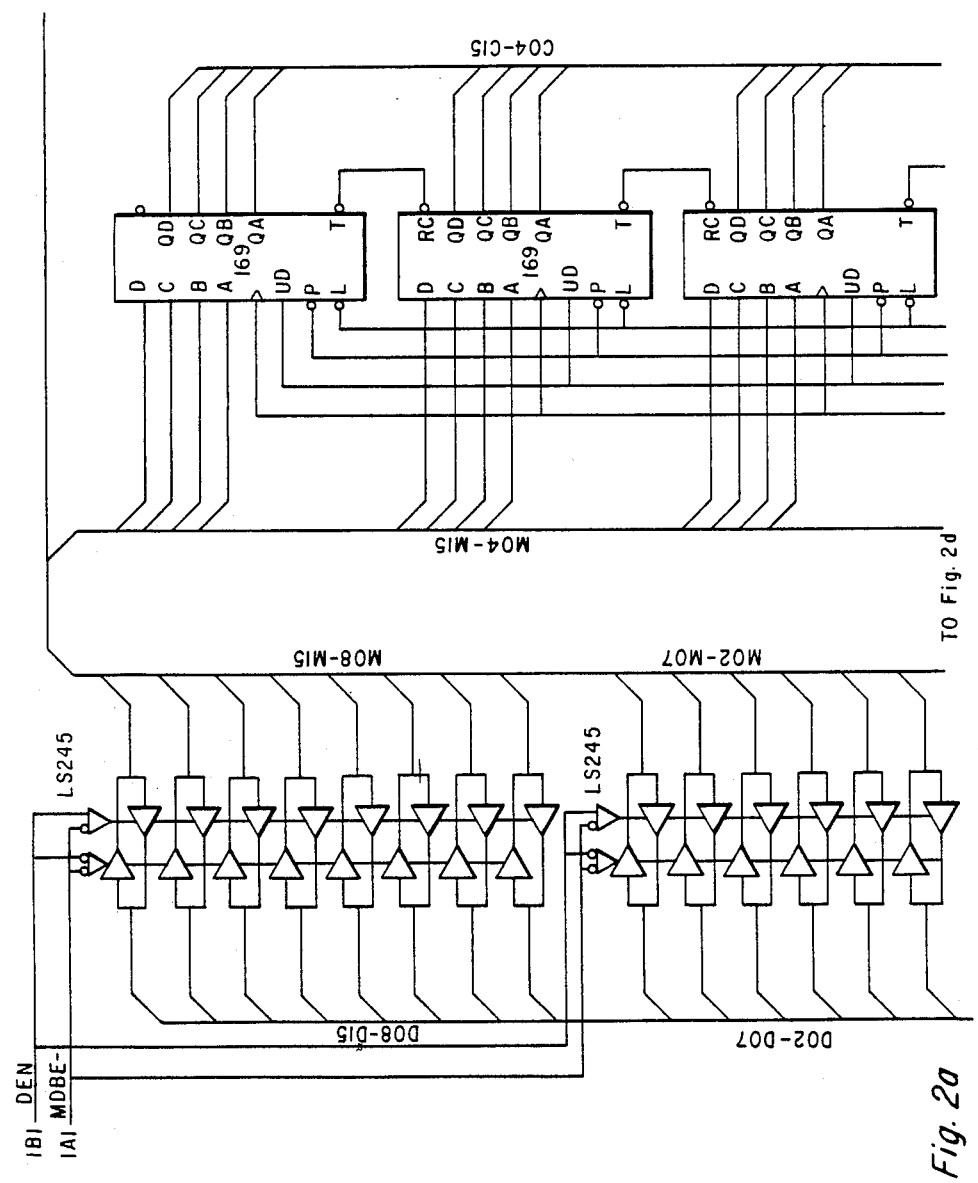
Figure 2B:
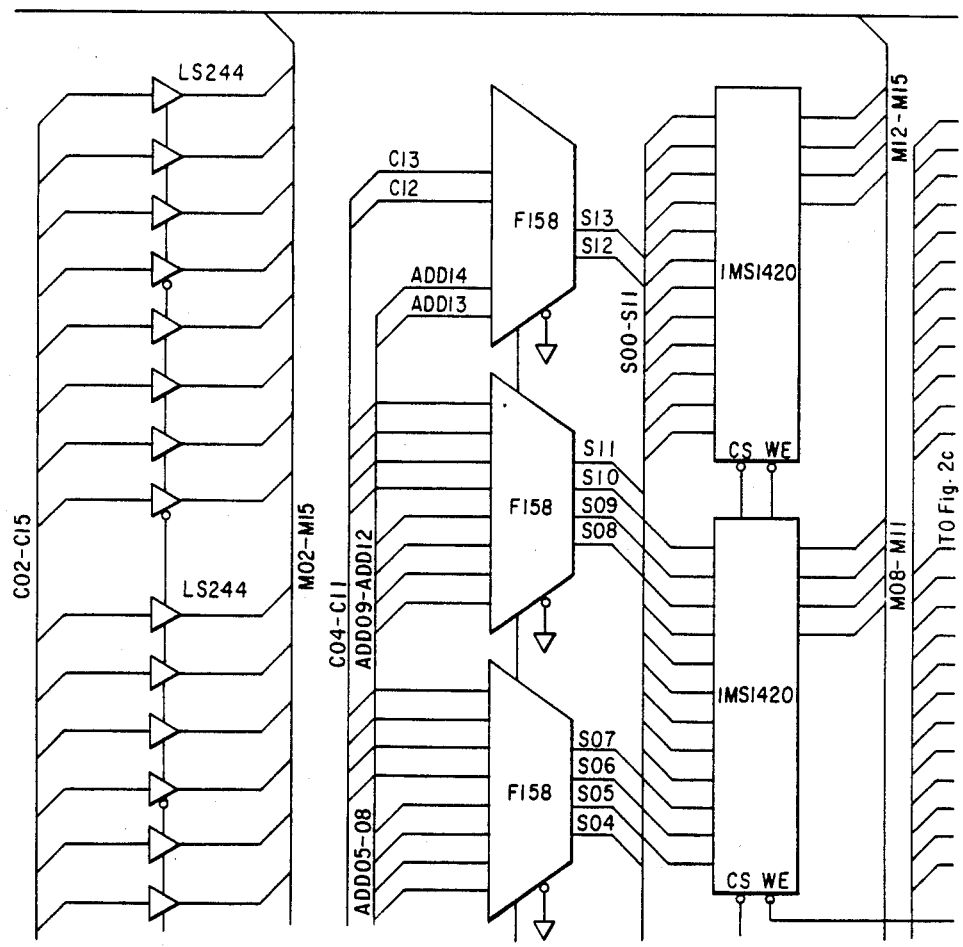
Figure 2C:
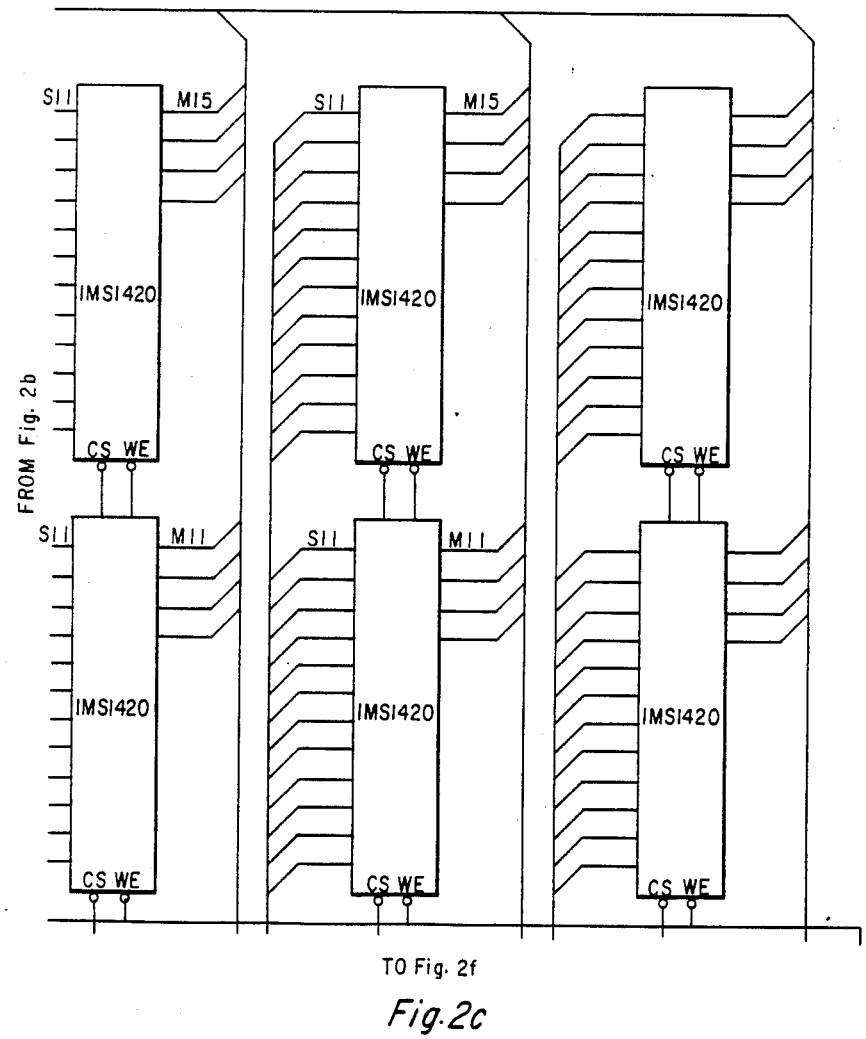
Figure 2E:
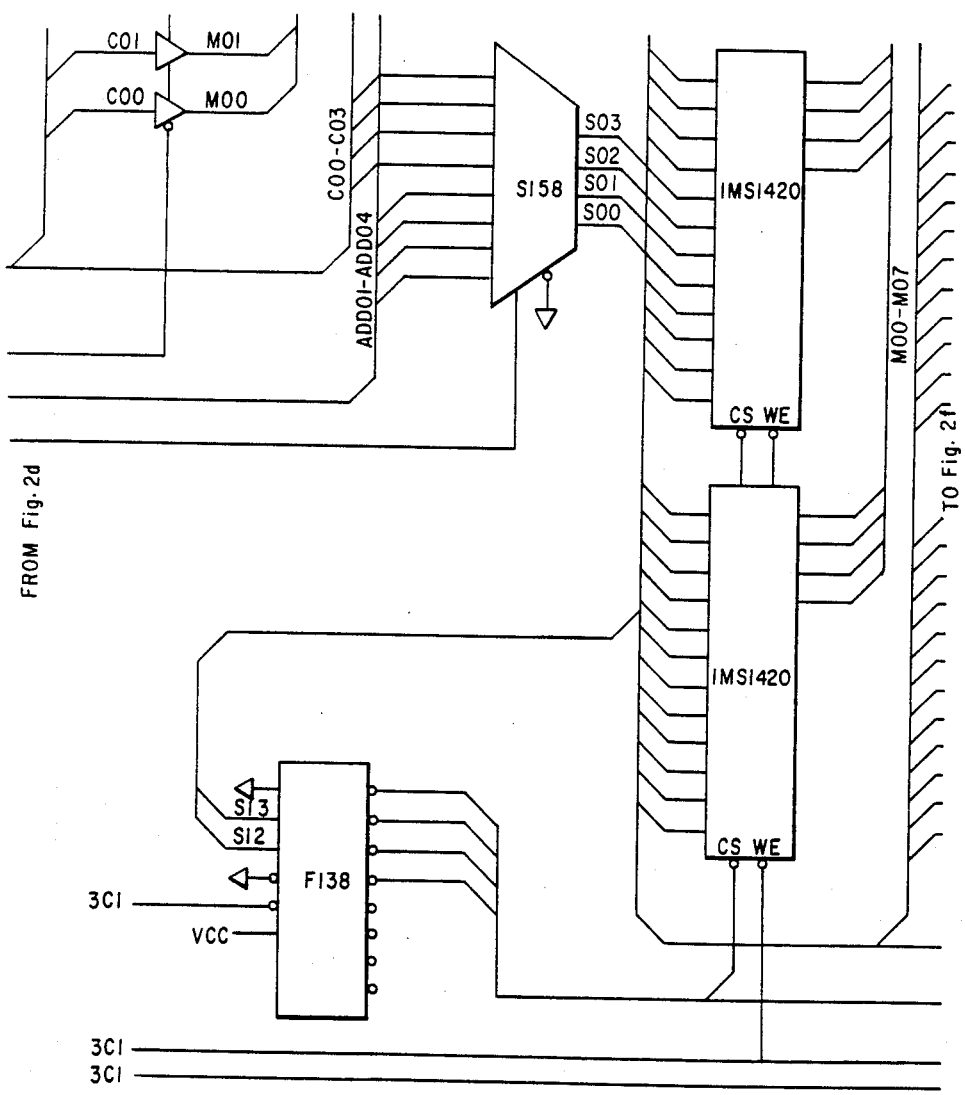
Figure 2F:
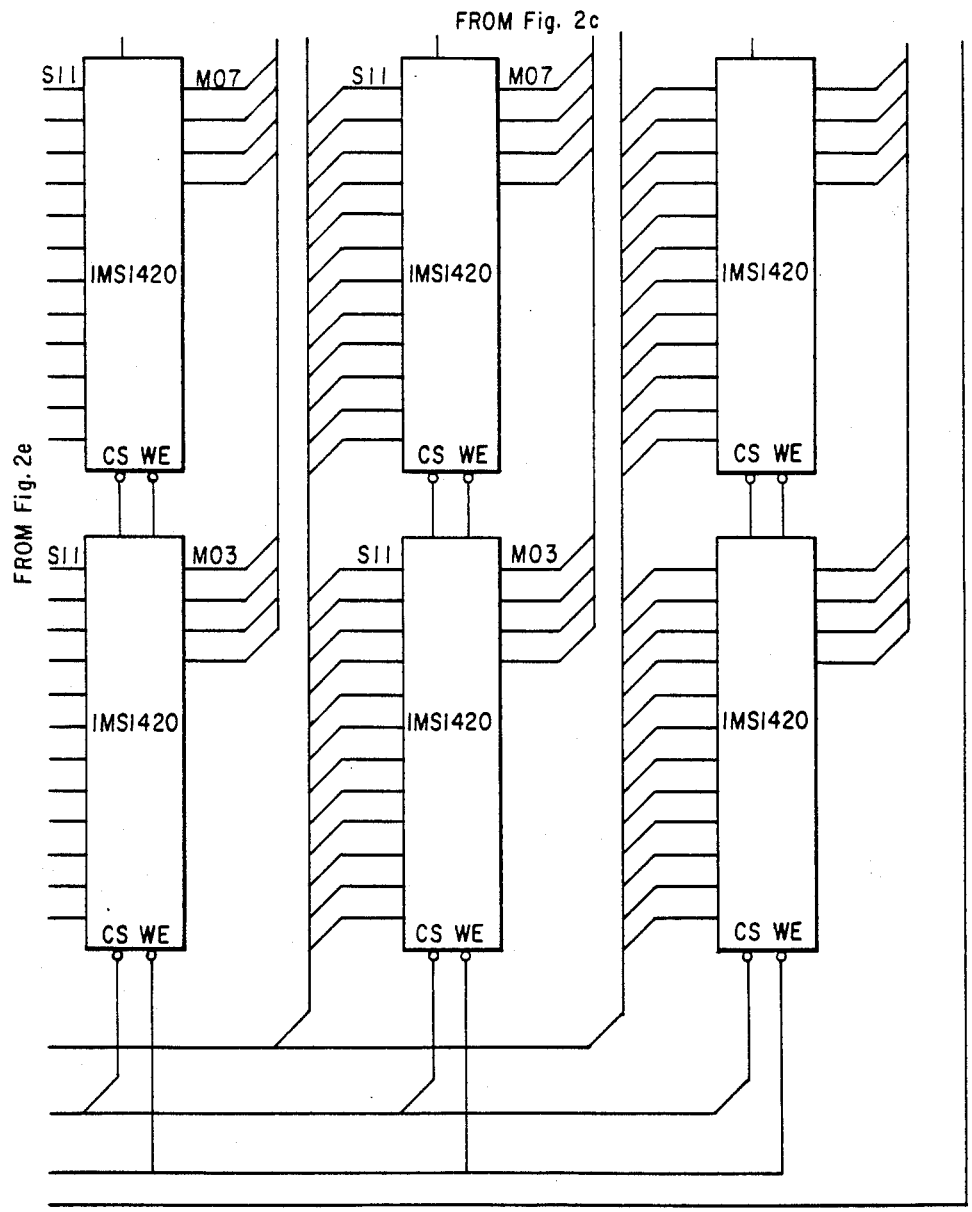
Figure 2G:
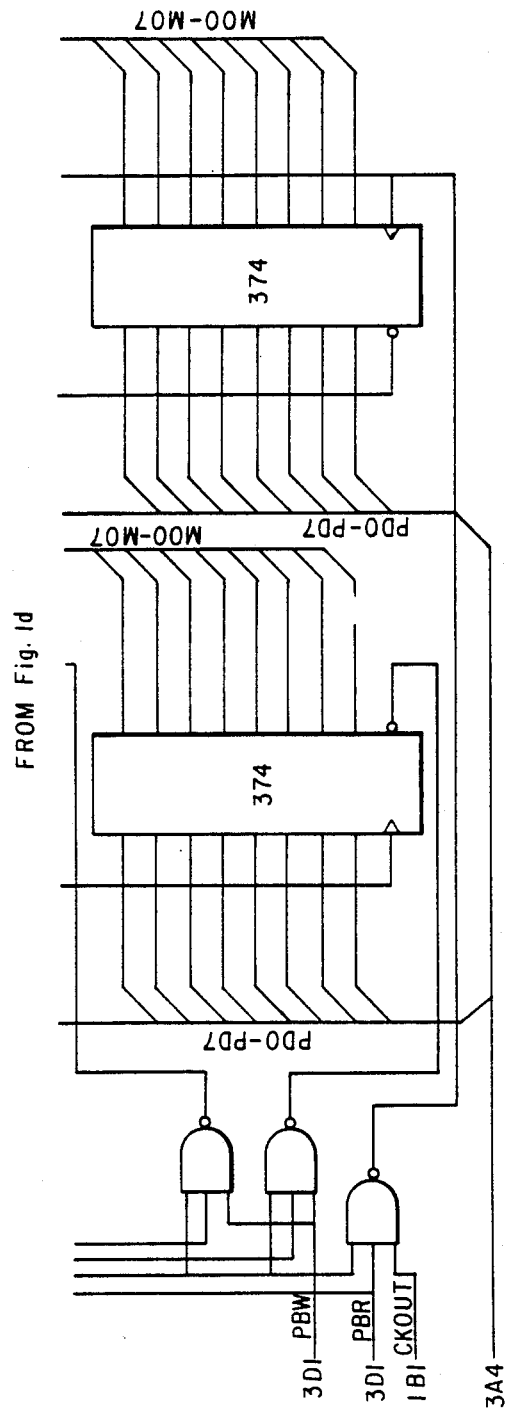
Figure 3A:
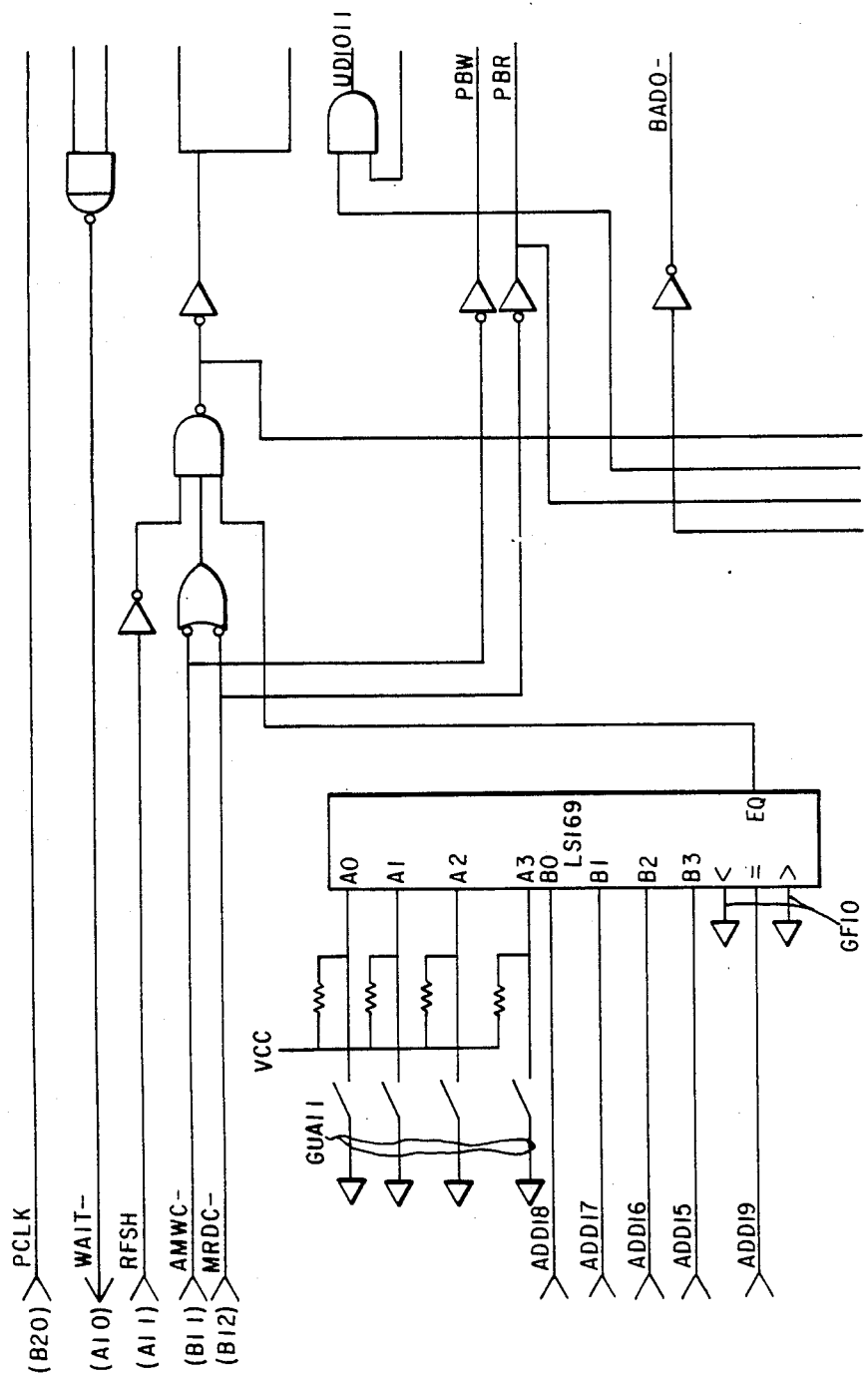
FIGS. 3a through 3g show a third portion of a schematic diagram of a speech processing plug-in card for a computer.
Figure 3B:
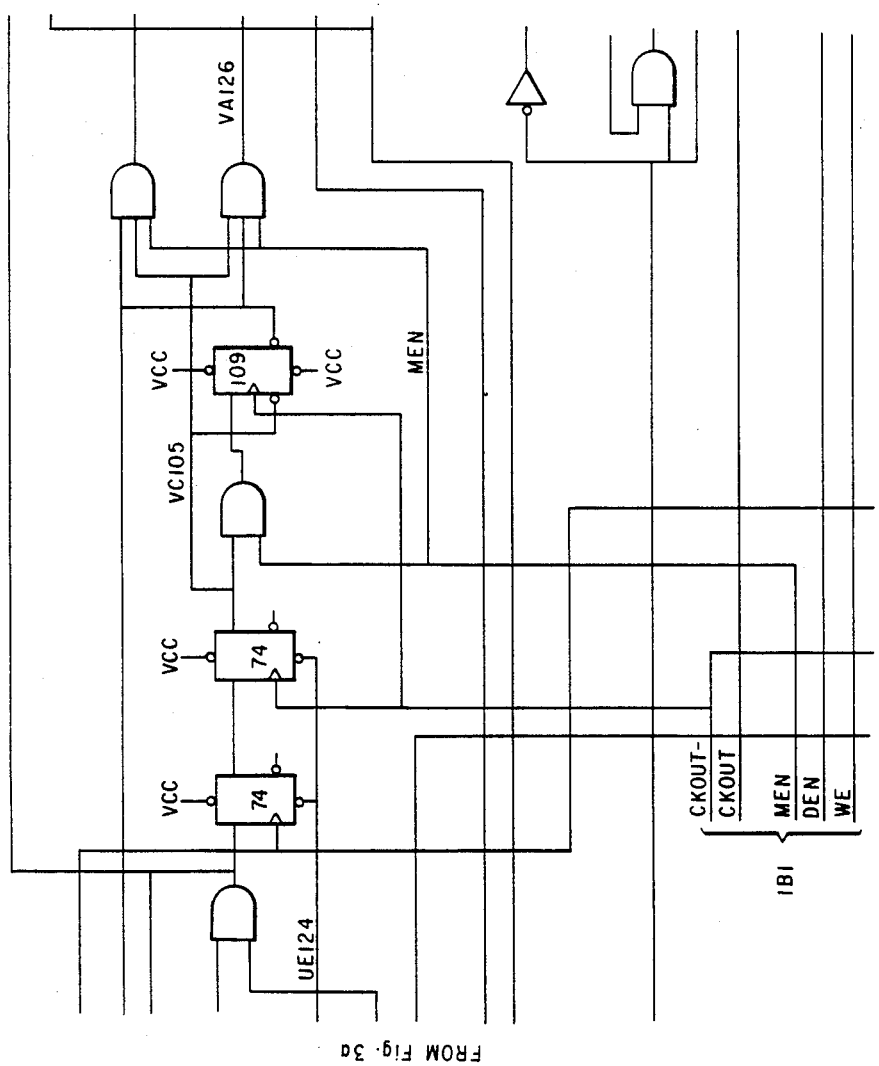
Figure 3C:
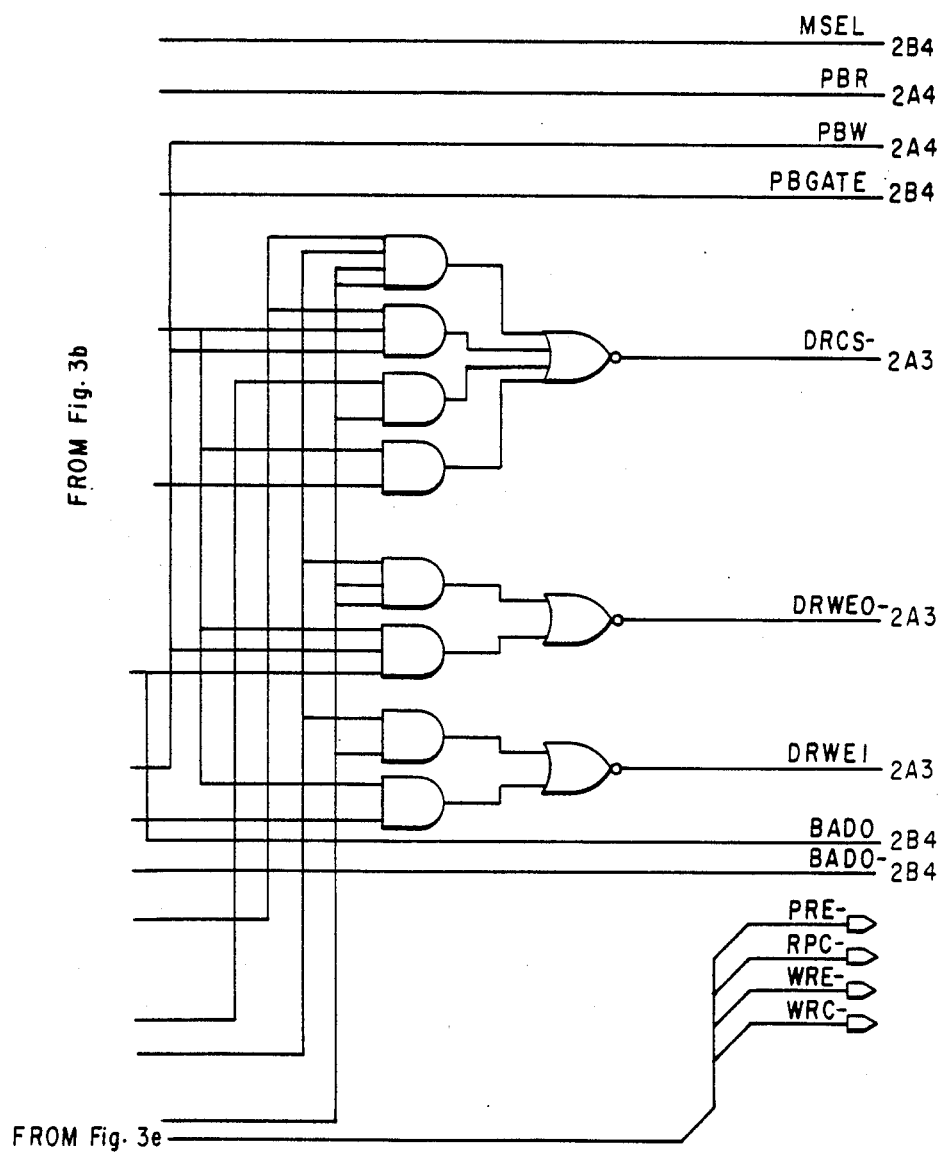
Figure 3D:
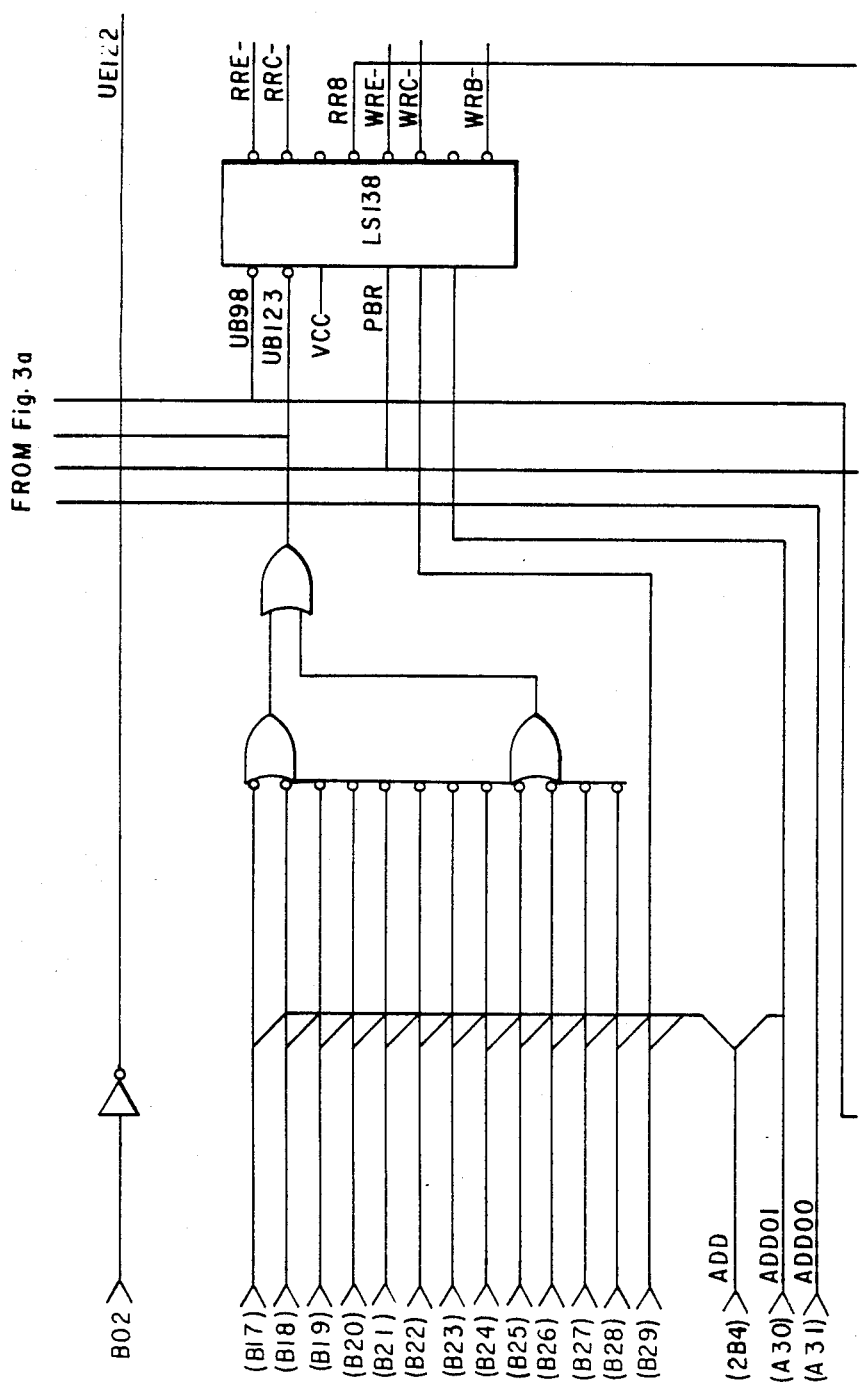
Figure 3E:
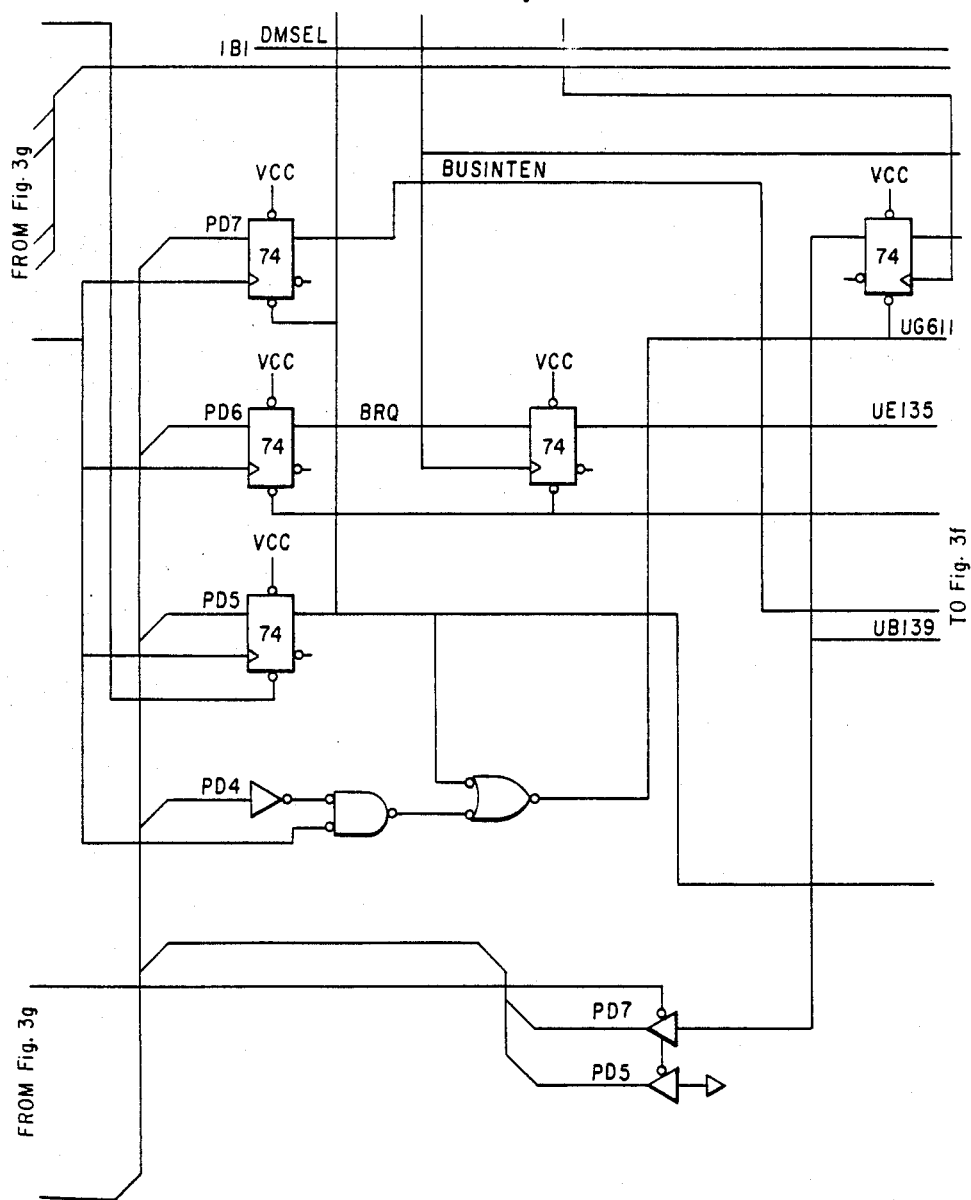
Figure 3F:
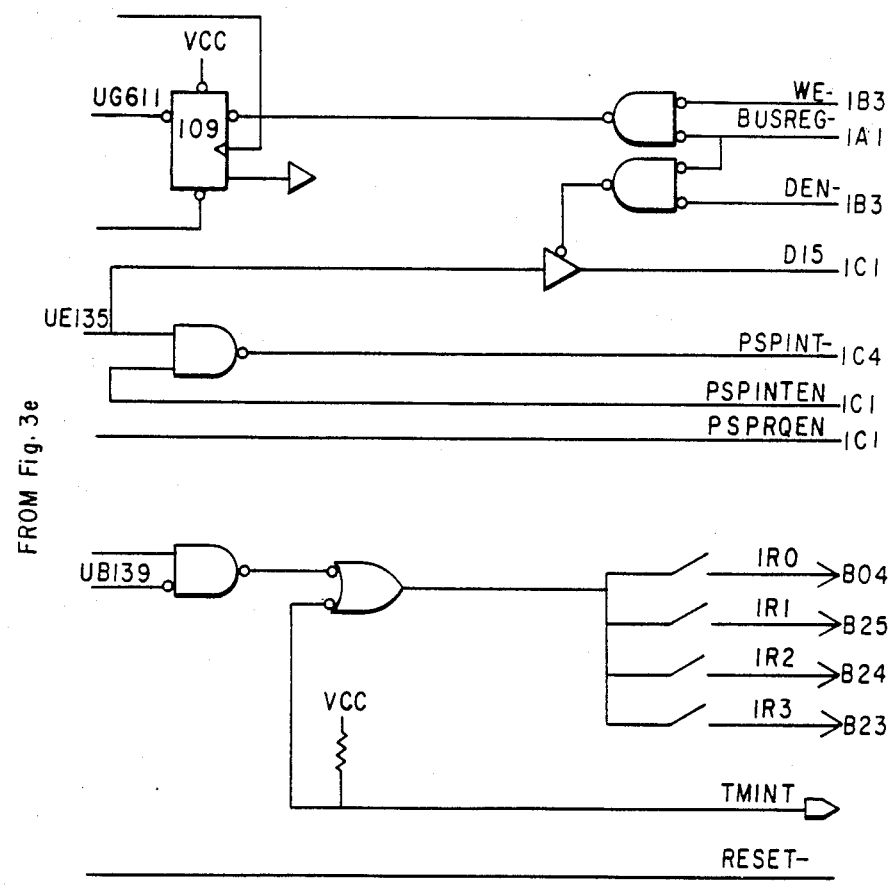
Figure 3G:
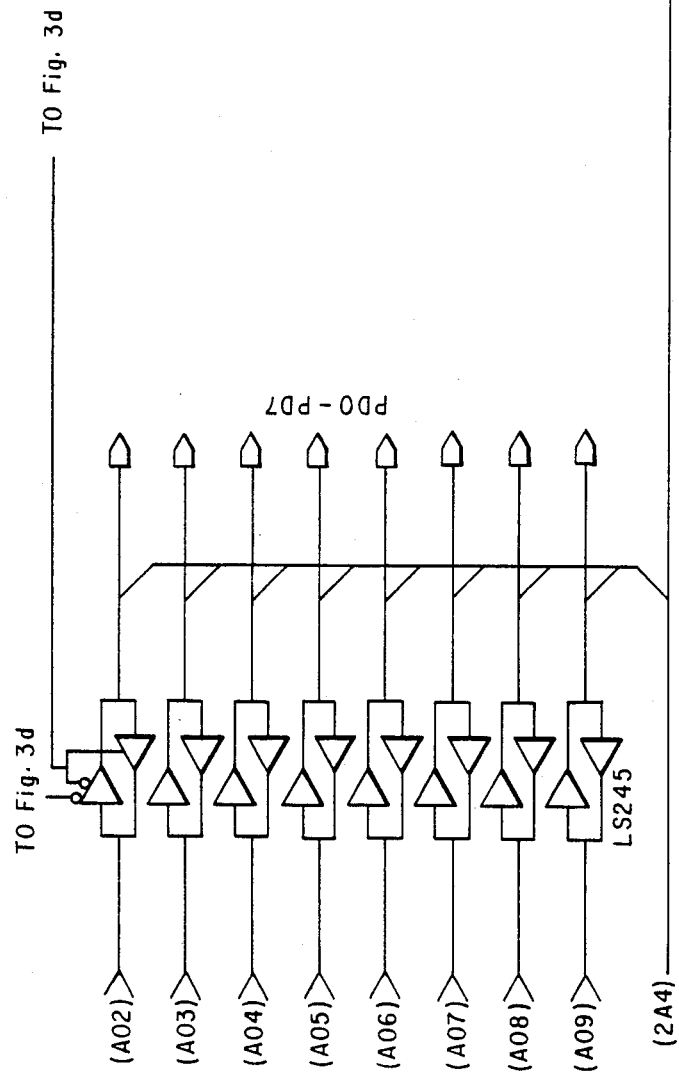
Figure 4B:
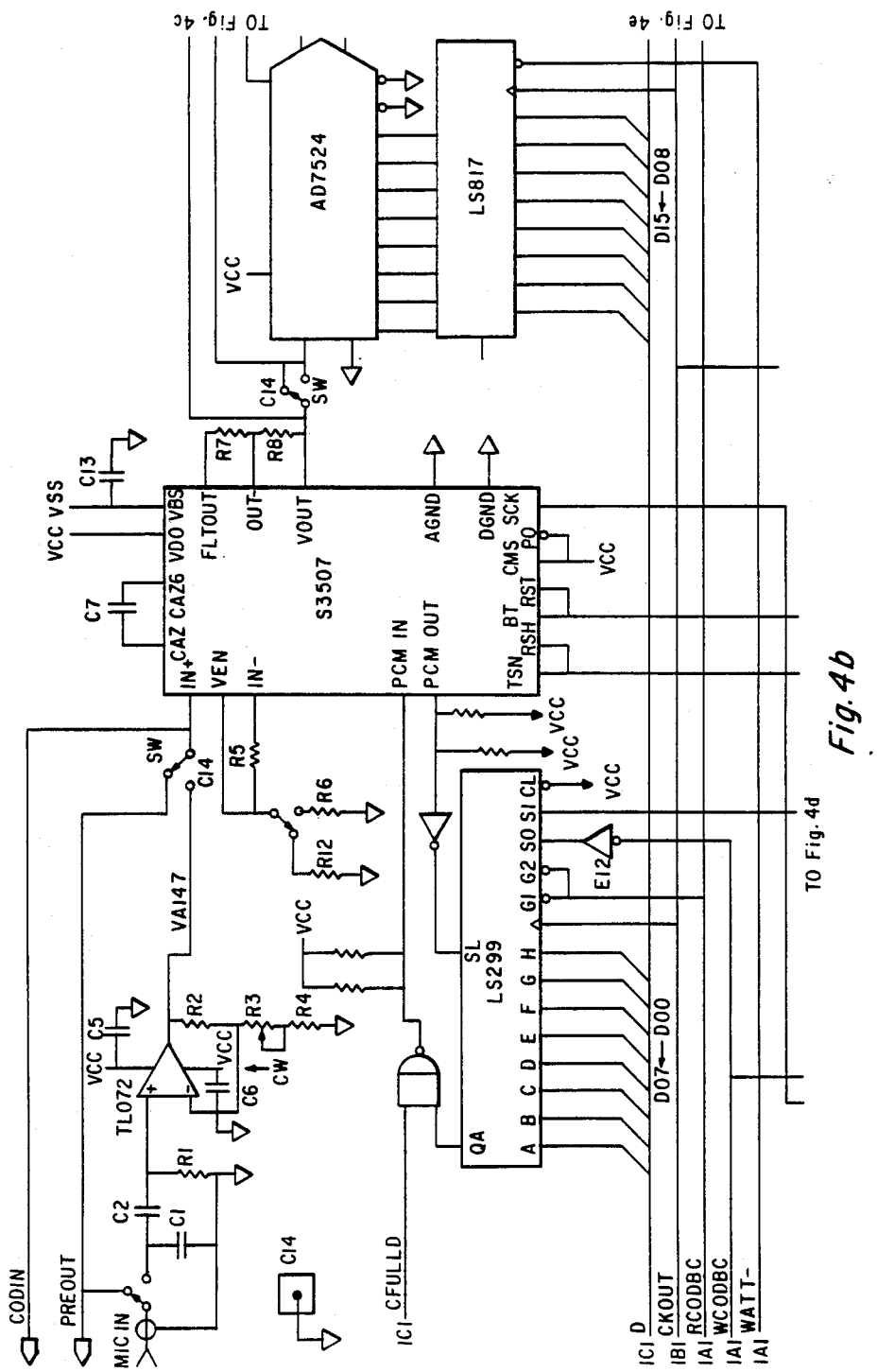
Figure 4C:
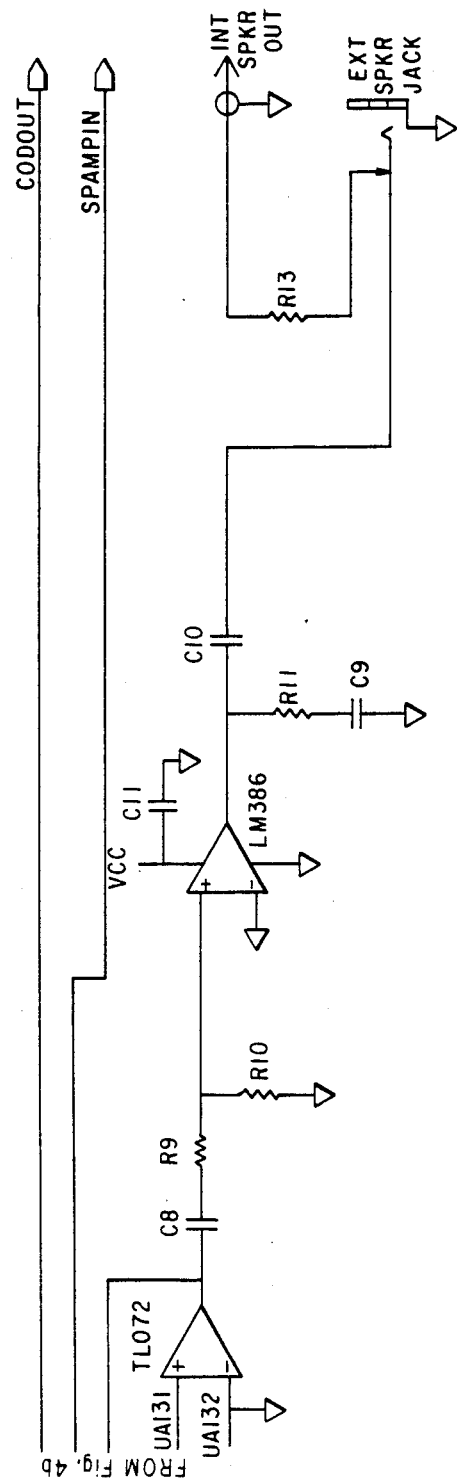
Figure 4D:
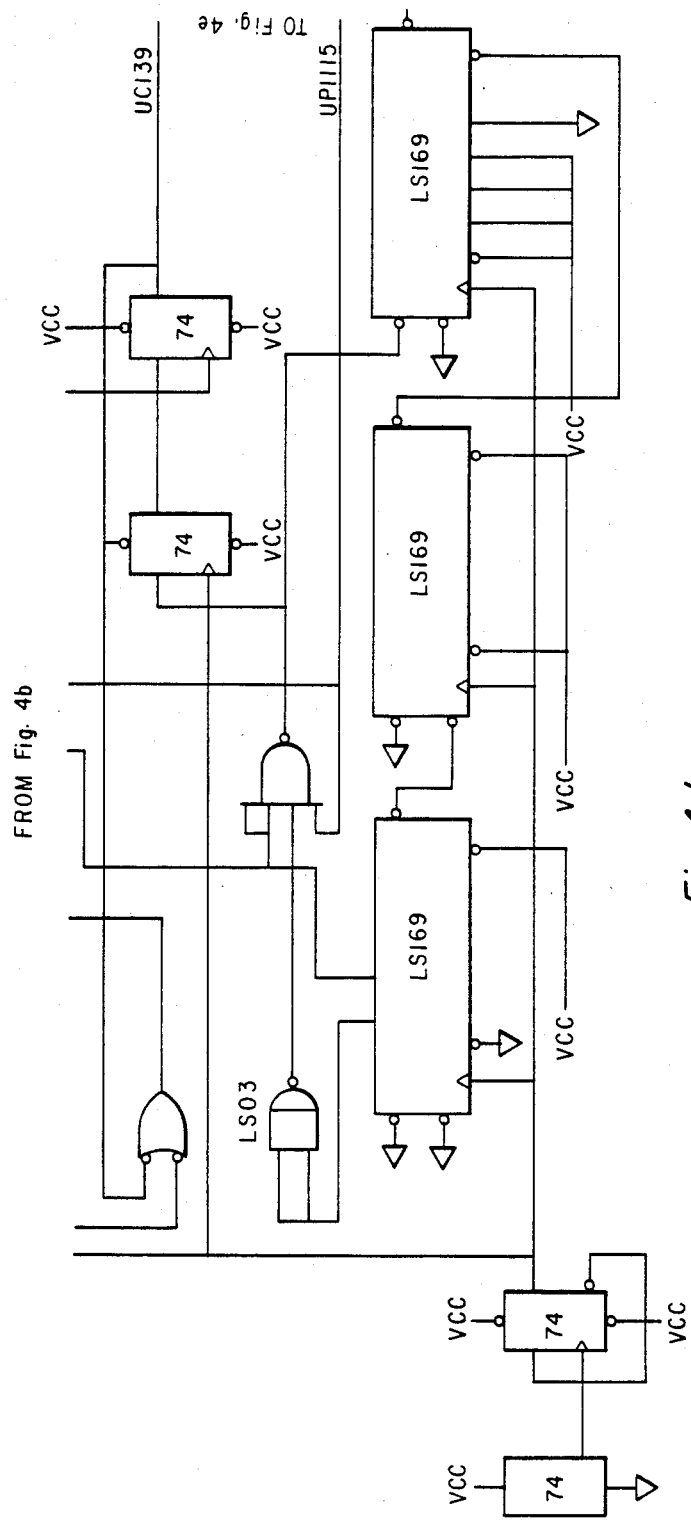
Figure 5:
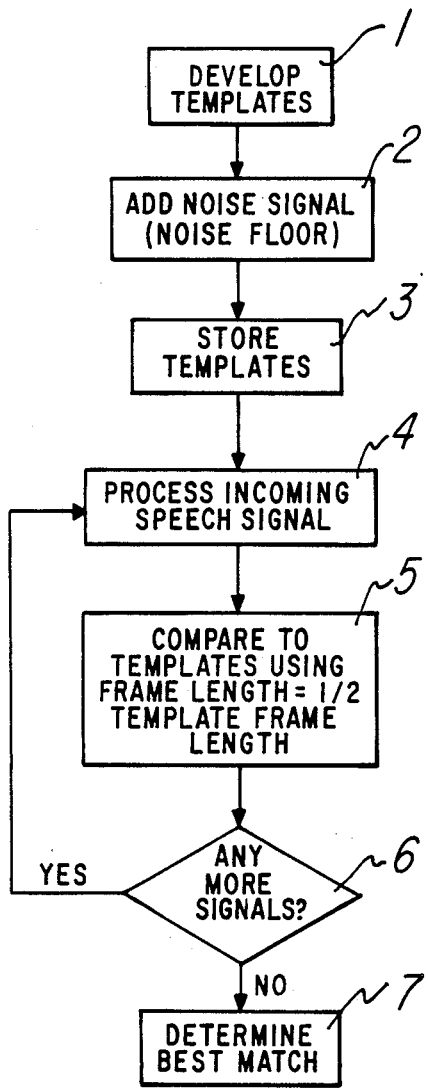
FIG. 5 is a flow diagram of a procedure for recognizing speech.

In practicing the present invention, the audible speech is first translated into a meaningful input for the system. (FIG. 5, step 4). For example, a microphone within range of the audible speech is connected to a microphone preamplifier and to an analog-to-digital converter. In the presently preferred embodiment, the input stream is sampled 8000 times per second, to an accuracy of 13 bits. The stream of input data is then arbitrarily divided up into successive "frames", and, in the presently preferred embodiment, each frame as defined includes 240 samples.

In one embodiment, the speech input frame is first transformed into a set of inverse filter coefficients $a_k$, as conventionally defined. See, e.g., Makhoul, "Linear Prediction: A Tutorial Review", proceedings of the IEEE, Volume 63, page 561 (1975), which is hereby incorporated by reference. That is, in the linear prediction model, the $a_k$'s are the predictor coefficients with which signal $S_k$ in a time series can be modeled as the sum of an input $u_k$ and a linear combination of past values $S_{k-n}$ in the series. That is:

$$S_n = - \sum_{k=1}^{P} a_k S_{n-k} + G u_n \tag{1}$$

Since each input frame is 20 milliseconds long, each input frame contains a number of sampling points, and the sampling points within any one input frame can themselves be considered as a time series. In one embodiment, the actual derivation of the filter coefficients $a_k$ for the sample frame is as follows: First, the time-series autocorrelation values $R_i$ are computed as $$R_i = \sum_n S_n S_{n+i}, \tag{2}$$

where the summation is taken over the range of samples within the input frame. In this embodiment, 11 autocorrelation values are calculated ($R_0$-$R_{10}$). A recursive procedure is now used to derive the inverse filter coefficients as follows:

$$E_o = R(o) \tag{3}$$

$$k_i = -\left[ R(i) + \sum_{j=1}^{i-1} a_j^{(i-1)} R(i-j) \right] / E_{i-1} \tag{4}$$

$$\begin{cases} a_i^{(i)} = k_i \\ a_j^{(i)} = a_j^{(i-1)} + k_i a_{i-j}^{(i-1)}, \text{ for } 1 \leq j \leq i - 1 \end{cases} \tag{5}$$

$$E_i = (1 - k_i^2) E_{i-1} \tag{6}$$

These equations are solved recursively for: i=1, 2, .., up to the model order p (p=10 in this case). The last iteration gives the final $a_k$ values.

The inverse filter coefficients are then transformed into a different set of autocorrelation coefficients which is now derived from the inverse filter coefficients $a_k$ $\rho_k$, themselves. This set of further autocorrelation coefficients is defined as:

$$\rho_k = \sum_p a_p a_{p+k}, \tag{7}$$

where the $a_i$ are defined to be zero for i greater than n. This formula defines a set of $\rho_k$ for values of k ranging from zero to n−10. In the presently preferred embodiment, only 1 $a_k$'s are computed, and values of $\rho_k$ are therefore computed for k ranging from zero to ten. However, the number of parameters computed is not at all critical. If fewer than 10 parameters are computed, accuracy is decreased, but this decrease may be completely acceptable, if, e.g., a small and carefully preselected vocabulary can be used. Conversely, a higher order linear predictive model can be used, in which case a larger number of parameters than 10 could be computed, although this would increase the computing load.

Thus, the foregoing steps have transformed the input frame into a filter-coefficient-autocorrelation vector. The basic dissimilarity measure is derived by forming the dot product of the time-series-autocorrelation vector ($R_i$) corresponding to the sample data with a filter-coefficient autocorrelation vector ($\rho_i$) corresponding to the reference data. This calculation measures the residual energy corresponding to the particular input frame and reference template being measured. In effect, the input is being filtered by an LPC inverse filter corresponding to the reference template. In addition, this dot product must be normalized by the self-residual energy of the sample frame. This self-residual energy E is defined as the dot product of the sample-time-series-autocorrelation vector with the sample-filter-coefficient-autocorrelation vector:

$$E = \sum_k \rho_k R_k \tag{8}$$

Thus, the foregoing process produces a scalar dissimilarity measure $D_{N,j}$, comparing an input frame j with a reference frame N, which is defined as:

$$D_{N,J} = \frac{\sum\limits_k R_k^{(j)} \rho_k^{(N)}}{\sum\limits_i R_i^{(j)} \rho_i^{(j)}} \tag{9}$$

where superscripts have been added to identify parameters derived from different frames.

It should be noted that the computation of filter coefficients $a_k$, which is significantly time-consuming, is performed only once for each input frame (to compute the residual energy E for normalization). The computation required of each reference frame is merely calculation of the dot product of the reference vector ($\rho_k$) with the normalized sample vector ($R_k/E$).

The foregoing has described a method for calculation of the distance measure using Durbin's recursive procedure to calculate the $a_k$'s for the sample frame. However, the presently preferred embodiment uses a procedure due to Leroux-Gueguen. In this procedure, the normalized error energy E, as defined above in equation 8, (i.e. the self-residual energy of the input frame) is produced as a direct byproduct of the algorithm. The Leroux-Gueguen algorithm also produces the reflection coefficients (also referred to as partial correlation coefficients) $k_i$. In a further alternative embodiment of the invention, the reflection coefficients $k_i$ are used instead of the filter-coefficient-autocorrelation parameters $\rho_i$ to encode the reference template input. This alternative is attractive because the reflection coefficients $k_r$ are very stable parameters, and are insensitive to coding errors (quantization noise). In this alternative embodiment, the reflection coefficients stored in each reference template would be converted to inverse filter coefficients ($a_k$), and the inverse filter coefficients would be converted to filter-coefficient-autocorrelation parameters (rho's), before each distance computation. Both the conversions of the reflection coefficients to filter coefficients, and the conversion of the filter coefficients to the $rho_k$'s, are fairly fast calculations. However, where processor time is a critical limitation, these additional calculations upon retrieval of every reference template do cause an additional burden on processor time, and therefore the preferred embodiment stores the reference templates in the autocorrelation domain, as $rho_k$ vectors.

The Leroux-Gueguen procedure is set forth, for example, in IEEE Transactions on Acoustic Speech and Signal Processing, page 257 (June 1977), which is hereby incorporated by reference. This algorithm is a recursive procedure, defined as follows:

$$k_h = -e^{(h)}_{h+1}/e^{(h)}_o \tag{10}$$

$$e^{(h+1)}_o = e^{(h)}_o (1 - k_h^2) \tag{11}$$

$$e^{(h+i)}_i = e^{(h)}_i + k_h e^{(h)}_{h+1-i} \text{ for all.} \tag{12}$$

This algorithm computes the reflection coefficients $k_i$ using as intermediaries impulse response estimates $e_k$ rather then the filter coefficients $a_k$.

Thus, the foregoing steps produce the scalar dissimilarity measure $D_{N,j}$ which shows the dissimilarity between an input frame j and a reference frame N. This dissimilarity measure is then transformed, through a dynamic programming procedure, into a minimal subsequence distance measure (scanning error) $E_{N,j}$, which is preferably defined as follows:

$$E_{Nj} = D_{Nj} + \min\left\{ E_{N-1,j-1} + K_1 E_{N-1,j-2}, E_{N-1,j-3} + \frac{K}{3}, E_{N-1,j-4} + K \right\}. \tag{13}$$

The quantity "K" is a constant which is used to impose a warping penalty. That is, the expected ratio of reference frames to sample frames is one reference frame to every two sample frames. (FIG. 5, step 5). However, if this is not in fact the actual spacing, then a penalty amount is added to the minimal subsequence distance for every reference in which the local ratio of input frames to reference frames is different from 2-1. Note that the penalty added where the ratio is locally 3-1 is much smaller than that imposed where the ratio is locally 4-1 or 1-1. Thus, only a modest penalty is added where the input speech is slightly slower than the reference speech rate (down to 1½ times as slow), but a substantially larger penalty is added if the input speech is faster than the reference speech, or is more than 1½ times as slow as the rate affected by the reference speech.

That is, where input frames are matched to reference frames at an average rate which is between 2-1 and 3-1, and where the time distribution of the input frame is the same as that of the reference frame, then the particular mappings of reference frame onto input frame within the optimal subsequence will vary between every other input frame and every third input frame, and the total speed-mismatch penalty will be a linear function of the speech rate mismatch. However, where the warping of the input sample is sufficiently nonlinear that, within the optimal subsequence, some adjacent pairs of the reference template sequence match either adjacent input frames or to input frames which are separated by three other input frames, an additional penalty will be added to the smooth penalty for linear warping. This additional penalty may be referred to as a nonlinear warping penalty, although it should be noted that nonlinear warping is penalized only if it causes some *local* portion of the reference-to-input mapping to be denser than 1-2 or sparser than 1-3. Thus, this warping penalty incorporates speech-rate information into the recognition process, but does not require large additional amounts of computation time.

The warping penalty, while preferred, is not strictly necessary for practicing the present invention. That is, the iterative statement of the dynamic programming measure can be restated as $$E_{Nj} = D_{Nj} + \min_{k \in [1,4]} \{ E_{N-1, j-k} \}. \tag{14}$$

Alternatively, a larger than 2-to-1 warping factor can be permitted, or a sparser ratio of reference templates to input frames could be used, as desired. The warping penalties can accordingly be widely varied.

The dynamic programming algorithm itself, while discussed above with reference to the particular kind of scanning error measure used in the presently preferred embodiment, is also separately inventive, and can be used with a variety of other scanning error measures to achieve word recognition (speaker-dependent or -independent). For the reasons noted in the background of the invention section, the ability to perform connected speech word recognition without a preliminary decision as to word endpoints is highly desirable, and greatly reduces the total error using any scanning measure whatsoever.

As each utterance begins, an energy detector detects that an acoustic signal is now being input into the system. As each successive input frame j is used, a new scanning error $E_{Nj}$ is successively updated for each reference template sequence (word). A minimum of all the $E_{Nj}$'s is also tracked. That is:

$$EMIN_j = \min_N E_{N,j} \tag{14}$$

The behavior of EMIN itself is now tracked over a time period. That is, as a succession of input frames j is read in, the behavior of EMIN is observed. At various points in time, EMIN will achieve various global minima. When EMIN has achieved a global minimum and thereafter increased by a predetermined amount, the local minimum which was just reached can therefore be identified as a significant local minimum. When such a significant local minimum has been reached, if the particular value of the accumulated dynamic programming measure $E_{nj}$ which caused the low value of EMIN as local minimum is below a certain level, then a good word recognition match has been achieved. That is, for some $E_{nj}$, the sliding comparison of the input frame sequence to the reference template sequence for that word N has produced a subsequence match which is (1) good, and (2) better than the subsequence matches for subsequences which end one step earlier or one step later than the subsequence value at the input frame j. Therefore, the match between the sequence of input frames ending in frame j and the sequence of reference templates which corresponds to word N, is a good match, and a word recognition (word N at time j) can tentatively be identified.

One further post-processing step is added, to avoid inconsistent recognitions: while an utterance continues, the tentative word recognition identifications are merely stored and are not yet provided as output. (FIG. 5, step 6). When an energy measure of the acoustic signal being input into the system indicates that one utterance (e.g. one string of connected words) has ceased, the various word recognition hypotheses can be checked against each other. (FIG. 5, step 7). If any of the word recognition hypotheses are identified at points in time which are impossibly close together, the two hypotheses are mutually inconsistent, and one of them must be excluded. For example, if tentative hypotheses are provided which indicate that the word "for" has been recognized at time point j and that the word "forty" has been recognized 100 milliseconds later, the two recognitions cannot both be true, since 100 milliseconds is not time enough to speak the word "forty" in a fashion which would be recognizable. Therefore, as between these two hypotheses, the hypothesis with the better value of EMIN is accepted, and the other hypotheses is excluded. Formally, this is performed by associating with each recognition hypothesis a vocabulary code number and a time. From the vocabulary code number the length of the reference template, and therefore the minimum length of a fairly recognizable word, can be quickly looked up. Therefore, it is a trivial further step to review the accumulated hypotheses, and measure if the difference in time between any two hypotheses is less than the minimum time associated with the later one of the two hypotheses. If so, a possible collision has resulted, and a choice must be performed between the two hypotheses.

The speaker-dependency of the method described is due to the speaker-specific reference templates used. To recognize speech from another speaker, the appropriate template set is loaded in. The following code, also describes how the template set is customized for a particular speaker. In general, the vocabulary desired is displayed to the user, and the user is then asked to pronounce each item of the vocabulary. This provides the initial identification of a word (a character set) with a string of reference templates (which is equivalent to a string of phonemes). (FIG. 5, step 1) (As noted above, the energy of the reference template is increased to provide a noise floor. (FIG. 5, step 2). This is preferably done in the autocorrelation domain ($R_0$ is multiplied by e.g., 1.1), but may be done in other equivalent ways.) Preferably the speaker is directed through the whole vocabulary several more times, so that better (averaged) values can be obtained for the reference templates. The averaged values are stored for later use. (FIG. 5, step 3). This is referred to as the update mode.)

One problem with voice recognition algorithms is that the reference data, as recorded under quiet conditions, may provide a poor match to words to be recognized, if the words to be recognized are input under noisy conditions. That is, the low-energy portions of the reference template can be swamped by the noise floor during word recognition input, so that a very poor match will be measured, in the low-energy portions of the reference template, between the reference template and the input. To avoid this problem, the presently preferred embodiment of the present invention uses energy weighting. High performance can be maintained under noisy conditions by merely weighting the reference data on a frame-by-frame basis as follows:

CONSIDER ONE REFERENCE PATTERN WITH N FRAMES IN IT (1) Given N frames of reference data RMS energies: $E(i)$, $i=1,N$.
(2) Compute N weights: $W(i) = \min(1, E(i)/EMN$, $i=1,N$ where EMN is a specified fraction (say 12.5% is a typical value) of the maximum RMS energy of the reference data RMS energies. I.E., EMN = $\max(e(i), i=1,N)*(0.125)$ The fraction can range from 0.0 (very quiet conditions) to 1.0 (very noisy).
(3) For each input frame, multiply the computed distances $D_{nj}$ for each reference frame by the corresponding weight $W(n)$. That is, the weak energy reference frames will tend to produce low errors after scaling.
(4) Let S equal the sum of the weights $W(i)$.
(5) The output error from Dynamic Programming is computed by the $((RES - S)/S)*e**(0.05*S)$, where RES is the sum of the SCALED normalized residuals (distances) for a given word.

That is $E_{nj}$ is preferably redefined on the dynamic programming procedure as $$RES = E_{Nj} = D_{Nj}W(N) + \min_{k}\{E_{N-1,j-k}\}$$

and the global minimum EMIN* is also preferably redefined as $$EMIN^* = \min_{j}\left(\min_{N}(E_{Nj}^*)\right)$$

where $$E^* \equiv ((RES-S)/S)*e^{(0.05S)}$$

The word length weighting multiplier (0.05) is purely empirical, but has been found to be advantageous.

Note that the factor $e**(0.05*S)$ tends to "favor" reference templates that are long. This improves performance and we refer to it as "word length weighting".

Where energy weighting is not used, the output error from dynamic programming would be computed as $((RES-N)/N)*e**(0.05*N)$. That is, the scanning error $D_{Nj}$ is originally defined as always greater than one. For more convenient computation in the valley finding procedure, the scanning errors are in effect renormalized to a set of numbers greater than 0, rather than to a set of numbers greater than 1.

The speech recognition system described in this disclosure is based on a unique implementation of the previously described algorithms. The key element in this implementation consists of a single-board signal processor which provides the complete capability to perform the algorithms required for speaker-dependent recognition as well as initial vocabulary enrollment. This card, referred to as the Peripheral Speech Processor (PSP) incorporates functions which include: analog filtering, A/D and D/A conversion, signal processing/control, and data storage and buffering. A second board, which contains a general-purpose microprocessor is used for application-dependent control of the PSP and for providing interface to the user via a terminal and/or a host computer system. A companion board to the controller contains additional program memory for the general purpose microprocessor.

PSP HARDWARE DESCRIPTION

A functional block diagram of the PSP is shown in FIGS. 1a-1f, 2a-2g, 3a-3g, and 4a-4k. The major components of this card are: a signal processing chip, (SPC), which is preferably the TMS320 from TI, an analog interface channel chip and a RAM module.

The analog interface to the system is accomplished using a commercially available single-chip combination codec/filter (Advanced Microsystems, Inc. S33507). This component provides anti-alias filtering and analog-to-digital conversion for the input function and digital-to-analog conversion and reconstruction filtering for the output function. The codec chip uses serial representation of the digital data. A single shift register is used to convert the data to/from the parallel format required by the TMS320. Thus, at each sampling time, parallel data destined for the digital-to-analog converter is shifted into the codec chip as serial data from the analog-to-digital- converter is shifted from the codec. When a new sample is assembled in the shift register the TMS320 is interrupted and must read from and/or write to the register to acquire/output a sample and clear the interrupt request. The digital data to/from the codec is in mu-law coded form and is converted from/to a 13-bit linear representation by software in the TMS320.

The function of the SPC is to provide the high-speed arithmetic processing required to implement the recognition algorithms. It is capable of performing a basic instruction cycle in 200nsecs and can perform one multiply-accumulate operation in 400nsecs. The chip also contains 1536 words of mask-programmable program memory and 144 words of RAM which are used as a high-speed scratchpad. Communication between the SPC and other elements on the PSP card is accomplished via a 16-bit parallel data bus, 3 I/O address lines, and a single level interrupt. For example, transfer of digital data from the AIC to the SPC occurs after the AIC interrupts the SPC and the SPC executes an input data operation from the AIC. A 3-bit port address in the instruction code is used by the SPC to specify input from the AIC. The input/output port addresses on the PSP card are listed in Table 1. The complete instruction set for the SPC is described in Table 2.

The principle function of the RAM module is to provide the storage required for the recognition templates. The size of this RAM is 16,384 17-bit words. The 17th bit is maintained to provide error detection. The RAM memory is accessed by the SPC via input and output instructions to specific PSP port addresses. A hardware address counter (external to the SPC) is used to address the RAM. This counter may be written to or read from by the SPC and will automatically increment or decrement following each RAM access depending on the state of an external mode bit preset by the SPC.

The remaining components on the PSP consist of miscellaneous SSI and MSI TTL devices which are required to implement functions that include interface to an external controller and multi-level interrupt handling. Because the PSP is designed to be a peripheral to the external controller it must communicate with the controller in order to synchronize timing and exchange digital data. The controller interfaces with the PSP through the Control Input Data Registers located on the PSP card. It also receives status and data from the PSP via the Status and Output Data Registers. Communication in both directions is interrupt-driven.

The single interrupt capability of the SPC is enhanced on the PSP card by utilizing an interrupt mask register, and interrupt return register and a priority encoder to implement a 4 level prioritized interrupt scheme. The SPC may make one or more interrupts by loading the interrupt mask register. If simultaneous interrupts occur which are not masked, only the highest priority interrupt is latched in the interrupt return interrupt service routing. This firmware routine determines which interrupt has occurred by reading the contents of the interrupt return register. The PSP interrupts listed in order of priority are: analog input buffer full, analog output buffer empty, RAM parity error, and controller command.

CONTROLLER HARDWARE DESCRIPTION

The controller, a TM990/101M-3, is a TMS9900 microcomputer board which includes up to 4K bytes of EPROM used for program and monitor permanent storage, two asynchronous serial I/O Ports used for interfacing to the system console and to the host computer, and a TMS9901 programmable systems interface device, used to interface to external interrupts and to time events. The controller board interfaces to other devices such as the PSP and the expansion memory via a parallel bus for address and data utilized to access slower non-time critical external conditions.

A companion memory card, the TM990/210 board, is used in this speech recognition system to provide increased storage space for controller program and data memory. This board contains 16K bytes of static RAM for temporary data storage and 32K bytes of EPROM for additional permanent program storage. The beginning addresses for both the RAM and EPROM are individually switch selectable in 8K byte increments.

PSP SOFTWARE DESCRIPTION

The approach to implementing this speech recognition system utilizes the PSP as a peripheral processor to the microprocessor controller. As such, the PSP is commanded by the controller to enter and exit various modes. Within each of these modes the PSP performs specific signal processing functions and transfers data and status to the controller. The modes of the PSP are described in Table 3. This section will describe each of these modes and will summarize key points about the implementation.

RECOGNITION MODE

The controller may command the PSP to enter the recognition mode after the enrollment template construction and update have been performed. The algorithms performed in this mode are: pre-emphasis, autocorrelation, LeRoux-Gueguen residual energy computation, distance computation, distance normalization, dynamic programming, and high-level post-processing.

The PSP maintains frame timing in the recognition mode by responding to interrupts from the AIC. The SPC is interrupted by the AIC every 16 samples (2 ms).

The 16 samples, previously converted from analog to digital by the AIC at an 8 KHZ rate, are input, preemphasized and stored in a circular buffer in the PSP RAM by the SPC. The decision to store the preemphasized speech in an external buffer greatly simplified the resulting code and increased the program efficiency. An autocorrelation subroutine is executed once per frame (every 20 ms) and operates on a 240 point (30 ms) window of speech samples stored in the PSP RAM. A 20 point internal buffer is maintained to perform the autocorrelation computation. Ten points at a time are read into this buffer. The algorithm then updates 11 partial autocorrelation lags using those ten points and the previously computed partial lags. This technique minimizes the complexity of the inner loop of the autocorrelation. This code requires approximately 16% of each 20 msec frame period to execute. The SPC routine which performs the inner loop of the autocorrelation is given below.

One-half frame of Hamming window coefficients are stored in a table in program memory and are used to window the buffered speech prior to extracting the 11 autocorrelation lags. These truncated to 16 bits.

The autocorrelation lags are then normalized and passed to the LeRoux-Gueguen subroutine. This subroutine performs the conversion of the autocorrelation lags to reflection coefficients and computes the energy of the resultant residual signal. The SPC subroutine code which performs the LeRoux-Gueguen algorithm is given below.

After 8 frames of autocorrelation parameters have been collected the SPC performs an inner product of the vector of autocorrelation lags for each input frame with the entire set of template data. These computations are used to derive the distance measures which are the basis of the recognition algorithm. The template data is stored in the PSP RAM in the form of feature vectors. Storage capability for a maximum of 800 40msec frames of feature vectors is provided. There are a number of feature vectors associated with each vocabulary word. Each vector corresponds to a 40 msec interval of time and consists of 11 coefficients. These coefficients represent the autocorrelation of the impulse response of an LPC inverse filter constructed from an averaged 40 msec interval of speech. The distance computation subroutine accesses the template data in the external PSP RAM by reading from a specific port address and manipulating the address counter which points to elements within this RAM. Each set of 11 coefficients is input to the SPC, and an inner product is computed for each of the 8 input frames, normalized by the self-inverse energy, and checked for saturation. This "batch" processing technique is utilized to minimize the I/O required to shuffle template data to the SPC. Eight frames of autocorrelation coefficients are stored internally. The template data for each reference frame therefore need only be read in once for each 8 frame "batch" of input data. The SPC subroutine code which performs this distance computation is shown below. Since it must be executed for each frame of reference data, the execution time of the distance computation is thus vocabulary dependent.

The dynamic programming subroutine is executed to determine the optimal cumulative distance (cost) as a function of time between a set of autocorrelation lags assumed to end at the current frame time and a set of template vectors. An optimal distance between the input and each vocabulary word is computed assuming that the current frame time is the end of the utterance. The distance is computed by optimally mapping the stored reference data onto the appropriate input frames so that the minimum total distance is obtained. Rather than store the past sets of autocorrelation lag vectors to accomplish this optimal mapping, the SPC stores partial error arrays which are updated and contain equivalent information. These arrays are of dimension four by the number of reference frames per vocabulary word and these arrays are maintained by the SPC in PSP RAM.

The algorithm strategy to compute the distance between eight current input frames and a specific reference frame and then to update the eight elements of the error array row which corresponds to that reference frame. The subroutine maintains an array of 11 errors computed by taking the sum of the latest input distance and the minimum of the four errors pointed to by a sliding window. At the beginning of the computation the four errors which correspond to the current frame are read in, the sum of the current computed distance is added to the minimum of these four, and the result is written over the oldest of the four stored errors. The window pointer to the four element array is shifted by one and the process continues for 8 frames. Finally the last three errors in the 11 element array and the latest computed error are saved in external ram. This approach maintains the optimum dynamic programming cost without specifically storing the optimum dynamic programming trajectory. The listing of the SPC code which performs this procedure is given below. The dynamic programming routine passes the set of errors referred to as scanning errors to the high-level post-processing subroutine.

The SPC post-processing subroutine processes the set of scanning errors computed by the dynamic programming subroutine to determine if an utterance is to be recognized and identified. It does this by tracking the minimum and next best minimum scanning errors each frame. A word hypothesis is generated whenever a local minimum in the scanning error sequence has been confirmed, the valley point error is less than a threshold EMAX, and the difference between the best and next best word errors is greater than some threshold EDELT. After an utterance has been declared (using an energy-based endpoint detector), each hypothesis is tested for to insure that enough time has elapsed between words. If the inter-word time separation is less than some threshold (function of the number of reference frames in the template), it is presumed that not enough time has elapsed between words and that only the best hypothesis should be retained. If the separation is greater than the threshold, the first word is declared to have been recognized and the second hypothesis is retained. Each stored hypothesis is tested in a similar fashion. If any hypotheses are found to be legal, the corresponding words are declared recognized by passing the number of recognized words to the controller via the Output Data Register. The controller then must access the external RAM on the PSP to determine which words have been declared.

ENROLLMENT MODE

The controller may command the PSSP to enter the enroll mode whenever a new set of templates is to be constructed. The algorithms performed in this mode include autocorrelation, endpoint detection, and autocorrelation coefficient storage. The objective of these algorithms is to mark the endpoints the initial utterance, extract the autocorrelation coefficients, and store these coefficients in the PSP RAM.

After being commanded by the controller to enter the enrollment mode, the PSP maintains frame timing and computes the autocorrelation coefficients in the same fashion as done during the recognition mode described previously. These coefficients are stored in a circular buffer in PSP RAM. The energy is also computed each frame and appended to each set of autocorrelation coefficients. When the energy exceeds a fixed threshold, the starting time is initialized. The utterance ending time is declared when the frame energy is less than the 0.125 times the maximum energy found in the utterance and the subsequent sixteen frames contain low energy. The beginning point of the utterance is then determined by searching backward in time from the initial starting frame until the frame energy falls below the same threshold. The search continues until the threshold exceeds the energy in each frame for all sixteen frames prior to the starting frame hypothesis. At this point in the algorithm, every other frame of autocorrelation coefficients is stored in the template. After storing the coefficients in the enrollment template, the PSP notifies the controller that the mode has terminated and the PSP returns to the idle mode. A listing of the SPC code which performs the endpoint detection is given below.

After the PSP returns to the idle mode, the controller may then command the PSP to return to the enrollment mode for enrollment on other vocabulary words or it may command the PSP to enter one of the other modes. Upon entering the recognition mode, the PSP will convert the entire template of autocorrelation coefficients to inverse filter autocorrelation coefficients. These coefficients may not be reconverted back to coefficients suitable for template updating.

UPDATE MODE

The controller may command the PSP to enter the update mode in order to modify the templates by multiple utterance of a vocabulary word. In this mode, the PSP actually performs processing similar to that performed during recognition. Frame timing is maintained by processing interrupts from the AIC. Autocorrelation, residual energy computation, and distance computation are performed as in the recognition mode. The distance measurement however is applied between the input and the single a priori specified vocabulary word. The dynamic programming algorithm is also similar to the algorithm performed during recognition mode. However, it is also necessary to temporarily store the input autocorrelation coefficients in a circular buffer and to retain information which describes how to progress through the set of stored coefficients along the optimum time-aligned trajectory. This information is stored in the form of back-pointers per 16-bit word in a circular buffer in PSP RAM. The dynamic programming algorithm outputs the scanning error for the single vocabulary word to the update post-processing routine. A listing of the SPC code which performs the dynamic programming including back-pointer storage is given below.

The post-processing required to support the update mode is identical to that required for recognition except that recognition is being performed on only one word. If this word is recognized, the algorithm attempts to time align the stored reference pattern with the appropriate input autocorrelation coefficients. During the time-alignment process the SPC uses the packed back-pointer information stored in the PSP RAM to update the templates. The SPC accesses the array of back-pointers to determine, at each reference frame i, whether it is necessary to progress backwards one, two, three, or four input frames to extract the set of coefficients to be averaged with the template reference frame $i-1$. The back-tracking continues with the SPC accessing the PSP RAM to obtain both the back-pointers and the corresponding input data for each reference frame in the template. For each reference frame, the time-aligned autocorrelation coefficients are linearly averaged with the associated set of reference frame autocorrelation coefficients and these coefficients are then restored to the PSP RAM. After all reference frames in the vocabulary have been averaged the number of updates corresponding to that word is incremented and this parameter is also stored in PSP RAM. A listing of the SPS code which performs the update time-alignment including packed back-pointer unpacking, back-tracking, and coefficient averaging is given below.

CONTROLLER SOFTWARE DESCRIPTION

The purpose of the controller in this recognition system is to provide the application-dependent control of the PSP card and to provide the interface to a user and an optional host computer.

The main controller routine consists of a command interpreter which calls various subroutines based on a single character input by the user. This command interpreter is written as a PASCAL "CASE" statement shown below:

```
CASE CHX OF
    'V' : VOCABULARY ;
    'E' ENROLL ;
    'U' UPDATE ;
    'S' : RESTOR_TEMPLATE ;
    'A' : ARCHIVE_TEMPLATE ;
    'R' RECOGNIZE ;
    'M' MODIFY_SYSTEM_PARAMETERS
    'H' HELP ;
    OTHERWISE WRITELN(OUT1,' NOT A LEGAL COMMAND')
END;
```

It may be seen that the basic controller commands allow the user to perform all the necessary operations to build a vocabulary list, enroll on that vocabulary list, update selected vocabulary words in the list, save the enrollment template in the host computer, restore a saved template to the recognition system, and finally to enter the recognition mode using the selected vocabulary list.

In order to coordinate the words which are recognized by the PSP with the spelling of the word input by the user, the controller must maintain a list of vocabulary words which link the spelling of the word with a unique word identification code used by the PSP. This list, which also may contain a comment associated with each word, may be modified via various vocabulary list commands. This is one way that the user is able to alter the vocabulary of the recognition system - the vocabulary list is modified, and the new words are enrolled in the templates and optionally updated. The corresponding controller command to modify the vocabulary list is 'V' for vocabulary list operations. The vocabulary list operations available are listed below:

'A' : Add a word to the vocabulary list.
'D' Delete a word from the list.

'R' : Re-spell a word or revise a comment.
'L' List the current vocabulary words.
'H' List vocabulary operation command description.
'Q' : Exit the vocabulary operations mode.

When a new vocabulary list is built, the controller dynamically allocates memory for each vocabulary word entered by the user. Each packet allocated contains enough memory space to hold the spelling of the vocabulary word, a comment (e.g., 'Trial 2, 7/15/81'), the number of reference frames, and the current number of updates since enrollment. The vocabulary list is constructed as a linked list with a head pointer for traversing the list from beginning to end, as in a search for a particular word, and a tail pointer for adding new words to the end.

After constructing a vocabulary list, it is necessary to build the templates which contain the specific parameters required during recognition. The enrollment mode is entered by issuing the command of 'E' (Enroll) to the controller. In enroll mode the user specifies the starting vocabulary word with which to begin the enrollment. The controller then commands the PSP to enter the enroll mode and supplies the PSP with the appropriate word identification code. The controller then prompts the user by writing the spelling of the word to the terminal. The PSP will interrupt the controller to indicate the 'operation complete' condition. It also outputs the number of frames enrolled for the current vocabulary word to the Output Data Register. The controller then prompts the user and PSP with the next sequential vocabulary word, and continues until the list is exhausted. After each word is enrolled, the user has the option to continue with the enrollment of the next word or another word, or to exit the enroll mode entirely.

The user may update the template associated with any vocabulary word previously enrolled by entering the 'U' (Update) command. After this command is entered, the controller enters the template update mode. This mode is very similar to the enroll mode in that the user specifies the word to update, the controller prompts the user and the PSP, and the controller then waits for the 'operation complete' signal upon a successful update. The processing performed by the PSP differs however as the templates are updated by first performing a recognition of the designated word. After a successful update, the user may then choose to continue with the update of the next word in the vocabulary list, or another word in the list, or to exit the update mode entirely.

A second manner in which the user may build the templates in the PSP is provided by a restore from host capability. When an 'S' (Restore) command is entered, the controller enters the restore mode. In this mode, the controller accesses the host computer and reads a previously archived set of templates. Each template contains not only the speech-related recognition information but also contains the spelling of the word and the associated comment field. This information is read from the host computer one vocabulary word at a time and the controller constructs the vocabulary list and the PSP templates from the data. A word identification code is assigned to each vocabulary word as described previously. The user may also perform an archive command by entering 'A' which performs the inverse of this operation. The controller accesses the spelling and comment field for each vocabulary word in the current list and appends this information to the speech-related recognition data stored in the PSP RAM. This information is then written to the host computer one vocabulary word at a time for later use. Note that in each case, the controller moves data directly from/to the host computer to/from the PSP RAM and vocabulary list and only a minimal amount of controller RAM is required for buffering.

The system recognition mode is entered after the user enters the command of 'R' (Recognize). The controller then waits for the PSP to recognize words which are spoken. Each time the PSP recognizes an utterance the controller is notified via an interrupt that a recognition has occurred and the number of recognized words is passed from the PSP to the controller. The controller then accesses the PSP RAM to determine which words were recognized. When the recognition mode is entered, the template data created in the enroll and update modes is converted from autocorrelation coefficients to inverse filter autocorrelation coefficients. The latter set of coefficients is not suitable for updating. If further updating is anticipated, the user should archive the autocorrelation coefficient templates to the host computer.

The user is able to modify various system parameters by entering the 'M' (modify). This allows the important parameters of the system to be altered depending on the environment. For example, it is possible to modify the noise floor utilized in constructing the vocabulary templates, or modify the peak-valley ratio used in the recognition post-processing. The controller indicates the current state of all the system parameters which may be modified after the user enters the modify mode.

The final command which the command interpreter recognizes is the 'H' (Help) command which prints a list of all the other available commands to the terminal.

In the presently preferred embodiment of the invention, the recognizable vocabulary is approximately 30 words (it may be slightly less or more, depending on the average length of words in the vocabulary.) However, this is not by any means a necessary limitation of the invention. The maximum vocabulary size is limited only by two factors: the number crunching power of the processor, and the similarity of the various reference template sequences one to another. If a very large recognition vocabulary is used (e.g. 3000 words) the greater similarity of the words will make errors more frequent. In addition, the greater number of operations which must be performed for each input frame will require greatly increased processing power, or non-real-time operation.

The energy weighting used in the presently preferred embodiment in fact effectively puts a somewhat greater weight on the voiced than on the unvoiced input frames, although this weighting depends in part on the high-frequency cut off imposed by the analog input channel.

However, among the numerous modifications and variations which can be used in practicing the present invention, one modification which can be introduced is additional attention to the voiced/unvoiced character of the speech being recognized. For example, if a voiced/unvoiced decision as to each input frame and as to each template of a reference template sequence is made, a local penalty can be imposed on the scanning error of any comparison between a voiced input frame and an unvoiced reference template, or vice versa.

As will be apparent to those skilled in the art, the present invention can also be modified and varied in a wide variety of other ways. The scope of the invention therefore includes numerous modifications and variations, and is not limited except as expressly recited in the following claims.

What is claimed is:

1. A method for speech recognition, comprising the steps of:
   storing reference templates containing LPC enters corresponding to a plurality of portions of words in a predefined vocabulary, wherein said templates further include in the LPC parameters a noise signal having a magnitude which is a preselected fraction of the magnitude of the portions of words;
   receiving speech inputs, and transforming the inputs into a plurality of frames of LPC parameters; and
   calculating error values indicating the distance between each input frame and each of the reference templets, wherein an utterance is hypothesized to be that of the set of reference templates having the lowest error values.

2. A method for speech recognition, comprising the steps of:
   storing reference templates containing LPC parameters corresponding to a plurality of portions of words in a predefined vocabulary, each of the reference templates having a frame length;
   receiving speech inputs, and transforming the inputs into a plurality of frames of LPC parameters, the input frames having a frame length less than that of the reference frames; and
   calculating error values indicating the distance between each input frame and each of the reference templates using dynamic time warping, wherein an utterance is hypothesized to be that of the set of reference templates having the lowest error values.

3. The method of claim 2, wherein the input frames have a frame length which is one-half that of the reference frames.

4. A method for recognizing speech, comprising the steps of:
   storing reference templates containing LPC parameters corresponding to a plurality of portions of words in a predefined vocabulary, wherein the LPC parameters include a noise signal having an energy which is proportional to the energy of the word portions stored in said templates;
   receiving speech inputs, and transforming the inputs into a plurality of frames of LPC parameters; and
   calculating error values indicating the distance between each input frame and each of the reference templets, wherein an utterance is hypothesized to be that of the set of reference templates having the lowest error value.

* * * * *